United States Patent
Cook et al.

(10) Patent No.: US 11,898,644 B2
(45) Date of Patent: Feb. 13, 2024

(54) FRAC TRANSFER DIVERTER VALVE

(71) Applicant: FMC Technologies, Inc., Houston, TX (US)

(72) Inventors: James Cook, Porter, TX (US); Brian J. Baca, Houston, TX (US); Jeffrey Michael Partridge, Spring, TX (US)

(*) Notice: Subject to any disclaimer, the term of this patent is extended or adjusted under 35 U.S.C. 154(b) by 282 days.

(21) Appl. No.: 17/043,538

(22) PCT Filed: Apr. 17, 2019

(86) PCT No.: PCT/US2019/027986
§ 371 (c)(1),
(2) Date: Sep. 29, 2020

(87) PCT Pub. No.: WO2019/204519
PCT Pub. Date: Oct. 24, 2019

(65) Prior Publication Data
US 2021/0108494 A1 Apr. 15, 2021

Related U.S. Application Data

(60) Provisional application No. 62/659,066, filed on Apr. 17, 2018.

(51) Int. Cl.
*F16K 11/087* (2006.01)
*F16K 27/06* (2006.01)
(Continued)

(52) U.S. Cl.
CPC ...... *F16K 11/0876* (2013.01); *E21B 43/2607* (2020.05); *F16K 27/067* (2013.01);
(Continued)

(58) Field of Classification Search
CPC .... F16K 11/0876; F16K 27/067; F16K 5/061; F16K 5/0605; F16K 5/0694;
(Continued)

(56) References Cited

U.S. PATENT DOCUMENTS 2,661,926 A * 12/1953 Resek ................ F16K 11/0876
251/174
3,100,499 A * 8/1963 Bass ..................... F16K 5/0668
137/246.22
(Continued)

FOREIGN PATENT DOCUMENTS

CN 106641343 A * 5/2017
CN 108458134 A * 8/2018
(Continued)

*Primary Examiner* — David Colon-Morales
(74) *Attorney, Agent, or Firm* — Henry C. Query, Jr.

(57) ABSTRACT

A diverter valve which includes a valve body, an inlet, a plurality of outlets, an internal cavity to which the inlet and the outlets are connected, and a valve member which is movably positioned in the cavity. The valve member includes a through bore which is configured to connect the inlet with a corresponding one of the outlets for each of a plurality of operative positions of the valve member. In operation of the diverter valve, the valve member is movable between its operative positions to selectively connect the inlet with any one of the outlets.

10 Claims, 25 Drawing Sheets

(51) Int. Cl.
*F16K 5/20* (2006.01)
*E21B 43/26* (2006.01)
*F16K 11/076* (2006.01)
*F16K 11/085* (2006.01)

(52) U.S. Cl.
CPC ............. *F16K 5/205* (2013.01); *F16K 11/076* (2013.01); *F16K 11/085* (2013.01)

(58) Field of Classification Search
CPC ...... F16K 5/0657; F16K 5/0689; F16K 5/205; F16K 5/201; F16K 5/0636; F16K 5/0626; E21B 43/2607; E21B 43/26
See application file for complete search history.

(56) References Cited

U.S. PATENT DOCUMENTS

| | | | | |
|---|---|---|---|---|
| 3,345,032 A * | 10/1967 | Rawstron | ............ | F16K 11/0876 251/315.1 |
| 3,595,270 A | 7/1971 | McNeal, Jr. | | |
| 3,735,956 A * | 5/1973 | Matousek | ............ | F16K 11/0876 137/454.6 |
| 4,084,785 A * | 4/1978 | Herbert | .................... | F16K 5/06 251/315.13 |
| 4,566,494 A | 1/1986 | Roche | | |
| 4,572,239 A * | 2/1986 | Koch | ................ | F16K 27/067 251/286 |
| 4,685,488 A * | 8/1987 | Corbin | ................ | F16K 11/0876 137/328 |
| 5,893,393 A * | 4/1999 | Erdkamp | ............ | F16K 11/0876 137/887 |
| 5,906,224 A * | 5/1999 | Tupper | ................ | F16K 11/0876 137/835 |
| 5,911,405 A * | 6/1999 | Korczynski, Jr. | ..... | F16K 27/067 251/315.11 |
| 5,988,220 A * | 11/1999 | Sakaki | ................ | F16K 11/0876 137/625.22 |
| 6,247,839 B1 * | 6/2001 | Kochanowicz | ....... | B01F 25/311 366/173.1 |
| 7,690,626 B2 * | 4/2010 | Stunkard | ................ | F16K 5/0642 251/315.08 |
| 8,262,061 B2 * | 9/2012 | King | ..................... | F16K 5/0647 251/192 |
| 9,140,410 B2 * | 9/2015 | Malnou | ................. | F17C 13/04 |
| 9,915,359 B2 * | 3/2018 | Ricard | ................ | F16K 5/0673 |
| 10,072,763 B2 * | 9/2018 | Chen | .................... | F16K 3/0236 |
| 10,865,895 B2 * | 12/2020 | Magnus | ................ | F16K 11/0876 |
| 10,982,779 B2 * | 4/2021 | Morello | ................ | F16K 5/0689 |
| 11,079,034 B2 * | 8/2021 | Mentzel | ................ | F16K 27/0245 |
| 11,162,595 B2 * | 11/2021 | Scattini | ................ | F16K 5/205 |
| 2007/0125543 A1 | 6/2007 | McNeel et al. | | |
| 2009/0266424 A1 | 10/2009 | Seim | | |
| 2011/0147635 A1 * | 6/2011 | Seveso | ................ | F16K 5/0678 251/315.08 |
| 2014/0203203 A1 * | 7/2014 | Scattini | ................ | F16K 5/0673 251/317 |
| 2015/0267505 A1 | 9/2015 | McEvoy et al. | | |
| 2015/0354717 A1 | 12/2015 | Partridge et al. | | |

FOREIGN PATENT DOCUMENTS

| | | | | |
|---|---|---|---|---|
| EP | 0 198 129 A2 | 10/1986 | | |
| EP | 0198129 A2 * | 10/1986 | | |
| EP | 1881246 A2 * | 1/2008 | ......... | F16K 11/0876 |
| FR | 2 848 281 A1 | 6/2004 | | |
| FR | 2848281 A1 * | 6/2004 | ......... | F16K 11/0876 |

* cited by examiner

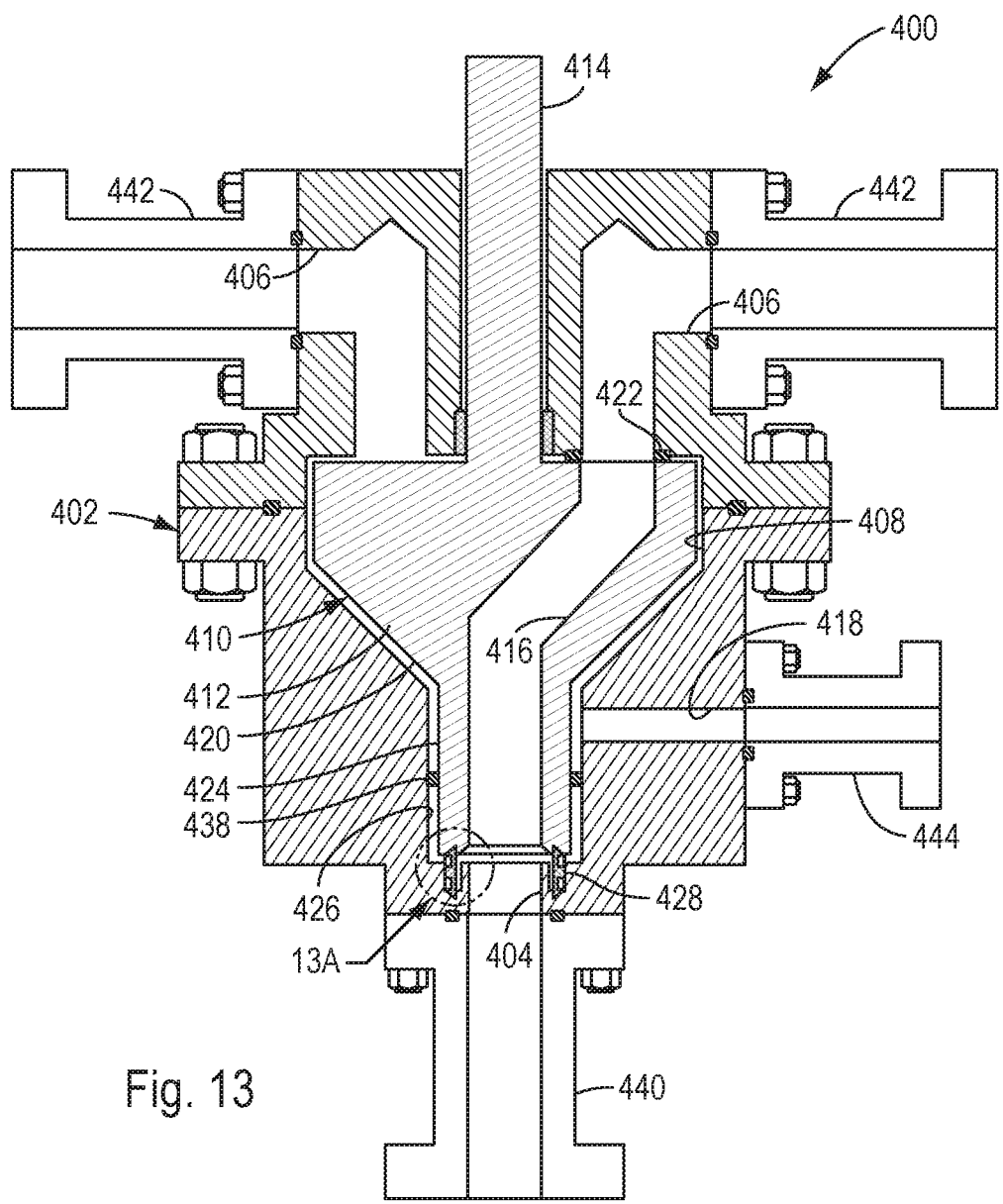
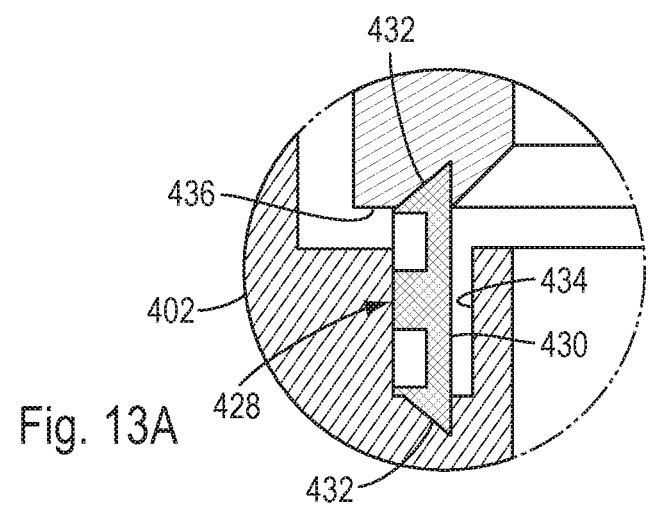
Fig. 13
Fig. 13A

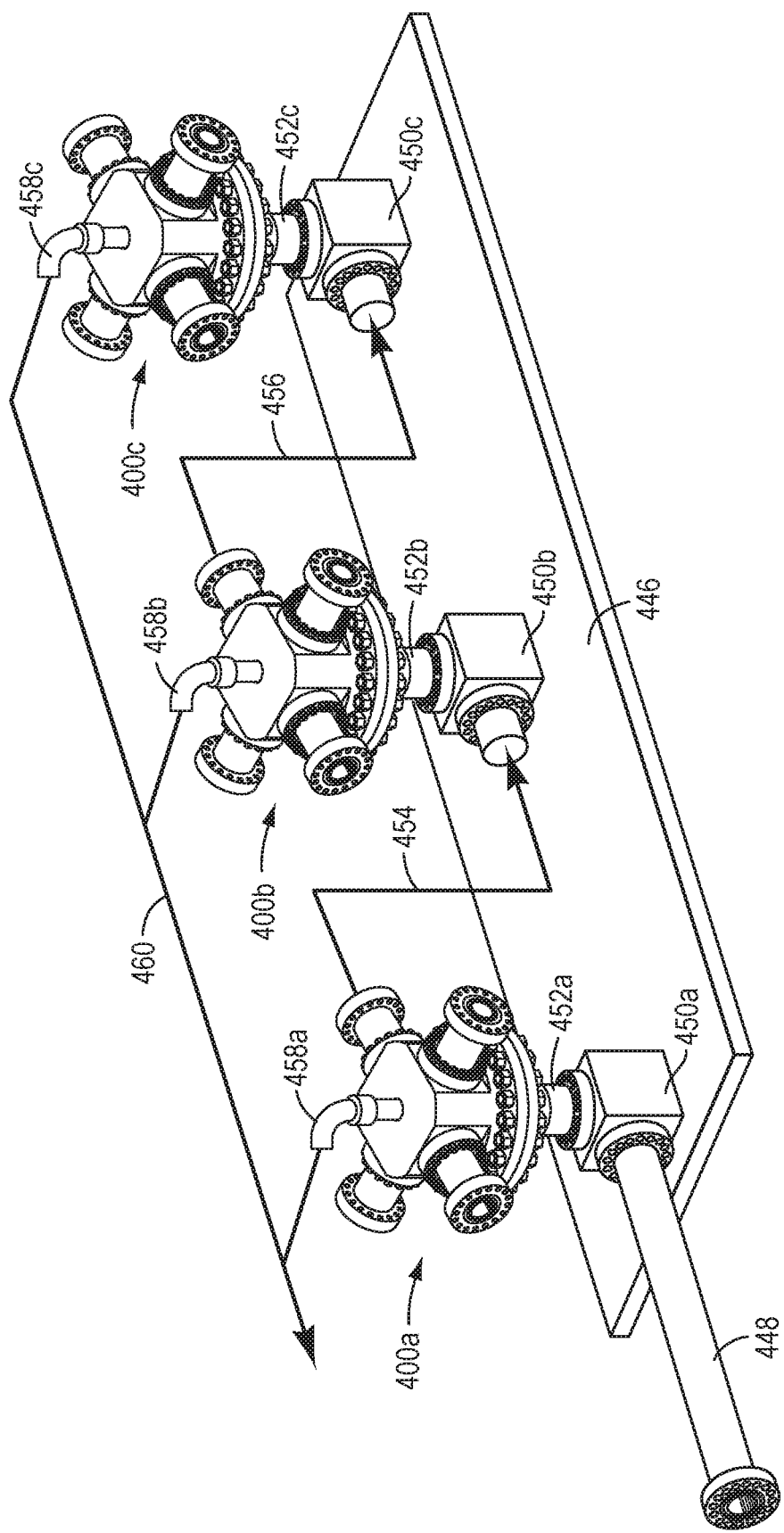

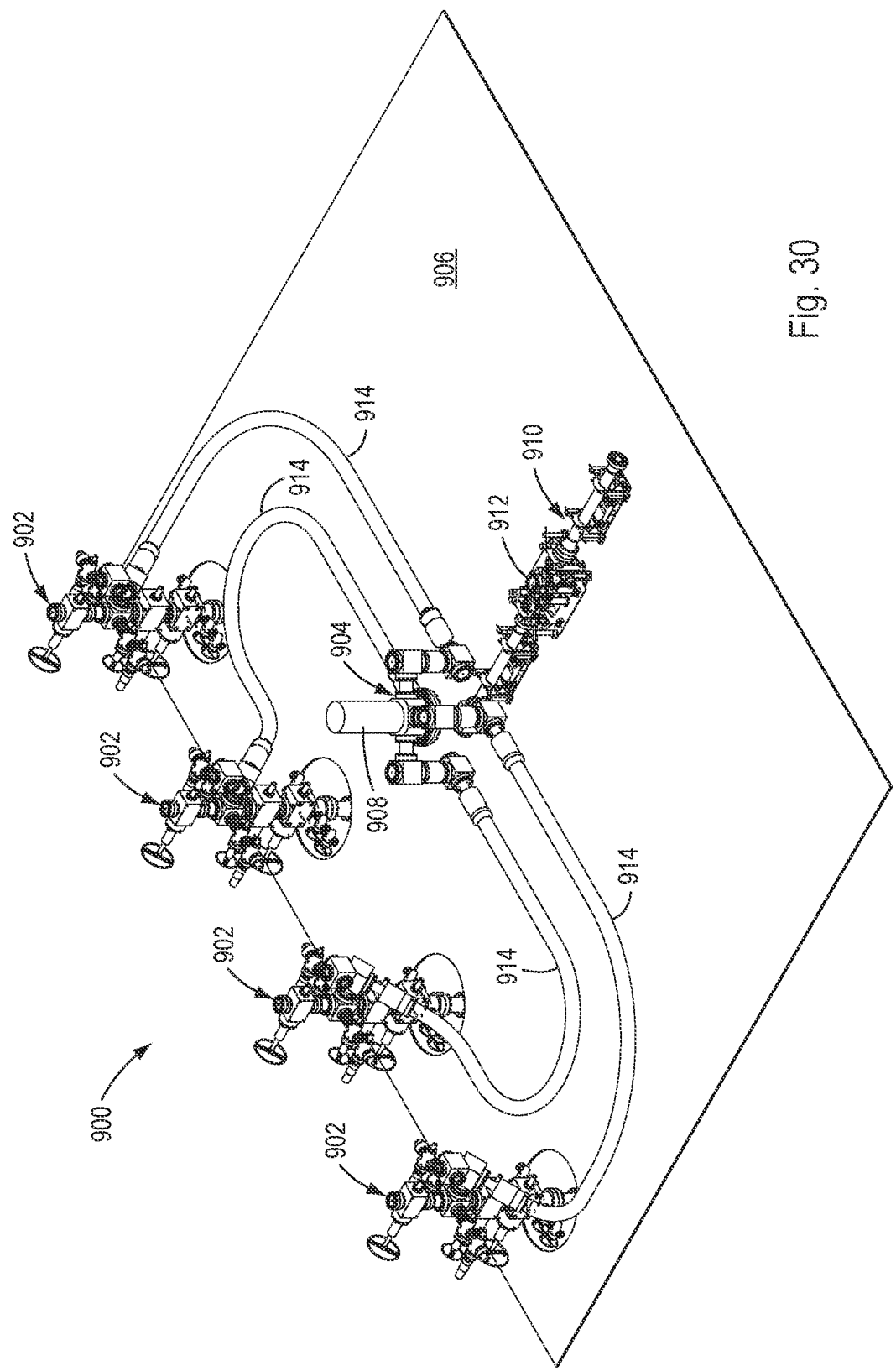

FRAC TRANSFER DIVERTER VALVE

BACKGROUND OF THE DISCLOSURE

The present disclosure is directed to a diverter valve for selectively connecting a well servicing apparatus, such as a pumping system for well fracturing operations, to a plurality of hydrocarbon wells. In one embodiment of the disclosure, the diverter valve is configured to selectively connect the well servicing apparatus to one of the wells while venting pressure from the other wells.

Hydrocarbon well sites often include a plurality of individual hydrocarbon wells which typically undergo various servicing operations at different points during their lifetime. One such operation which may be performed on the wells is a fracturing operation, in which a pumping system comprising a number of high pressure pumping units is used to inject a particle-containing slurry, or frac fluid, into the well in order to fracture the hydrocarbon bearing formation and thereby produce channels within the formation through which the oil or gas may flow.

In order to perform a fracturing operation on a well, the pumping system is typically connected to that well using an inlet pipe assembly. On a well site with multiple wells, each well may be connected to the pumping system through a corresponding inlet pipe assembly. However, this arrangement is relatively expensive and labor intensive. Alternatively, the pumping system may be successively connected to each well via a single inlet pipe assembly. However, this arrangement requires that after the fracturing operation is performed on the first well, the inlet pipe assembly be broken down and then made up to the next well, and so forth. Consequently, the fracturing operation can be labor intensive, and the time required to perform all of the fracturing operations can be excessive.

Another method for connecting the pumping system to multiple wells involves connecting the pumping system to a single manifold assembly which in turn is connected to all of the wells. One such prior art arrangement is depicted schematically in FIG. 1, in which the well site is shown to comprise three wells, each of which is capped by a frac tree 10. In this arrangement, the pumping system 12 is connected via an inlet pipe assembly 14 to a manifold assembly 16 which in turn is connected to the trees 10 through corresponding outlet pipe assemblies 18. The manifold assembly 16 comprises a cross block 20 having an inlet 22 which is connectable to the pumping system 12, three outlets 24 (one for each tree 10), and three gate valves 26, each of which is connected between a respective outlet and a corresponding outlet pipe assembly 18. In operation, the pumping system 12 is selectively connected to one of the trees 10 by opening the gate valve 26 connected to that tree and closing the gate valves connected to the other trees.

Although the arrangement shown in FIG. 1 alleviates the need to successively connect a single inlet pipe assembly to each tree 10, the three gate valves 26 make the manifold assembly 16 relatively heavy and expensive. Also, while a fracturing operation is being performed on one well, the only way the other wells can be vented is by disconnecting the outlet pipe assemblies 18 connected to those wells, which can be a time and labor intensive process.

SUMMARY OF THE DISCLOSURE

In accordance with the present disclosure, a diverter valve is provided which comprises a valve body, an inlet, a plurality of outlets, an internal cavity to which the inlet and the outlets are connected, and a valve member which is movably positioned in the cavity, the valve member comprising a through bore which is configured to connect the inlet with a corresponding one of the outlets for each of a plurality of operative positions of the valve member. In operation of the diverter valve, the valve member is movable between its operative positions to selectively connect the inlet with any one of the outlets.

In one embodiment of the disclosure, the through bore comprises a first end which is connected to the inlet and a second end which is connectable to a respective outlet for each operative position of the valve member. In one aspect, the through bore may comprise a inlet branch which is connected to the inlet and an outlet branch which is connectable to a respective outlet for each operative position of the valve member.

In accordance with one aspect of the disclosure, the valve member is rotatably supported in the cavity about an axis of rotation which is coaxial with the inlet.

In accordance with another aspect of the disclosure, the valve member comprises a cylindrical body portion and the through bore comprises an inlet branch which extends through the body portion coaxially with the inlet. The through bore may also comprise an outlet branch which extends laterally through the body portion from the inlet branch.

In accordance with a further aspect of the disclosure, the valve member comprises a spherical portion and the through bore comprises an inlet branch which extends through the valve member coaxially with the inlet. The through bore may also comprise an outlet branch which extends through the spherical portion from the inlet branch.

In accordance with another aspect of the disclosure, the inlet may be formed in an inlet spool which is connected to the valve body and comprises an end connection. The inlet spool may comprise an inlet mandrel which is configured to be received in an inlet bore in the valve body and sealed to the valve member.

In accordance with yet another aspect of the disclosure, the valve member may be supported in the cavity between first and second retainer members which are secured to the valve body on axially opposite ends of the valve member. In this embodiment, the inlet may extend through the first retainer member and the valve member may be connected to a valve stem which extends through the second retainer member.

In accordance with a further aspect of the disclosure, the valve member may comprise first and second annular lips which are formed coaxially with the axis of rotation of the valve member on axially opposite ends of the spherical portion. In addition, each of the first and second retainer members may comprise a retainer mandrel which extends through a respective bore in the valve body and engages a corresponding one of the lips to thereby inhibit axial movement of the valve member in the cavity.

In accordance with another aspect of the disclosure, the valve member may comprise first and second trunnion portions between which the spherical portion is positioned, and the inlet branch may extend through the first trunnion portion. In addition, each trunnion portion may be supported in a corresponding retainer mandrel.

In accordance with yet another aspect of the disclosure, the spherical portion may be positioned between a plurality of valve seats, each of which is positioned at an intersection of the cavity and a corresponding outlet, and each of which includes a seat bore which is aligned with the outlet and an annular sealing face which is configured to sealingly engage the spherical portion.

In accordance with a further aspect of the disclosure, each outlet may be formed in a corresponding outlet spool which is connected to the valve body and comprises an end connection. Each outlet spool may comprise an outlet mandrel which is configured to be received in a corresponding outlet bore in the valve body, and each valve seat may be retained in the valve body by a corresponding outlet mandrel.

In accordance with another aspect of the disclosure, each valve seat may be slidably supported in at least one of the outlet bore and the outlet mandrel. In addition, the diverter valve may further comprise a plurality of seals, each of which is slidably supported and sealingly engaged between an outer diameter surface of a corresponding valve seat and at least one of the outlet bore and the outlet mandrel.

In accordance with yet another aspect of the disclosure, the valve member may comprise a generally flat bottom and a cylindrical side surface. In this embodiment, the flow bore may comprise an inlet branch which extends through the bottom coaxially with the inlet and an outlet branch which extends through the bottom radially outwardly of the inlet branch. Also, each outlet may comprise an axial branch which is connectable with the outlet branch.

In accordance with further aspect of the disclosure, the diverter valve may also comprise a plurality of valve seats, each of which is positioned at an intersection of the cavity and an axial branch, and each of which includes a seat bore which is aligned with the axial branch and an annular sealing face which is configured to sealingly engage the bottom of the valve member.

In accordance with another aspect of the disclosure, each valve seat may be slidably supported in a counterbore which is formed in the axial branch, and the diverter valve may further comprise a plurality of seals, each of which is slidably supported and sealingly engaged between an outer diameter surface of a corresponding valve seat and the axial branch.

In accordance with another embodiment of the present disclosure, a diverter valve is provided which comprises a valve body, an inlet, a plurality of first outlets, a plurality of second outlets, a first internal cavity to which the inlet and the first outlets are connected, a second internal cavity to which the inlet and the second outlets are connected, a first valve member which is movably positioned in the first cavity, the first valve member comprising a through bore which is configured to connect the inlet with a corresponding one of the first outlets for each of a plurality of operative positions of the first valve member, and a second valve member which is movably positioned in the second cavity, the second valve member comprising a through bore which is configured to connect the inlet with a corresponding one of the second outlets for each of a plurality of operative positions of the second valve member. In operation of the diverter valve, the first and second valve members are movable between their respective operative positions to selectively connect the inlet to any one of the first outlets and/or any one of the second outlets.

In accordance with one aspect of the disclosure, the inlet may be connected to each of the first and second cavities via a respective inlet port.

In accordance with another aspect of the disclosure, each first and second valve member may comprise a spherical portion and each through bore may comprise an inlet branch which extends through the valve member coaxially with a corresponding inlet port. Each through bore may also comprise an outlet branch which extends through the spherical portion from a corresponding inlet branch.

In accordance with yet another aspect of the disclosure, each spherical portion may be positioned between a plurality of valve seats, each of which is positioned at an intersection of the first or second cavity and a corresponding first or second outlet, and each of which includes a seat bore which is aligned with the corresponding first or second outlet and an annular sealing face which is configured to sealingly engage the spherical portion.

In accordance with a further aspect of the disclosure, each first and second outlet may be formed in a corresponding outlet spool which is connected to the valve body and comprises an end connection. In addition, each outlet spool may comprise an outlet mandrel which is configured to be received in a corresponding outlet bore in the valve body, and each valve seat may be retained in the valve body by a corresponding outlet mandrel.

In accordance with another aspect of the disclosure, each valve seat may be slidably supported in at least one of the outlet bore and the outlet mandrel, and the diverter valve may further comprise a plurality of seals, each of which is slidably supported and sealingly engaged between an outer diameter surface of a corresponding valve seat and at least one of the outlet bore and the outlet mandrel.

In accordance with one aspect of the disclosure, at least one of the first and second outlets may be closed off to thereby define a closed position for the corresponding first or second valve member.

In accordance with another embodiment of the disclosure, the diverter valve may comprise a third valve member which is positioned between the inlet ports and is operable to selectively connect the inlet with each of the first and second valve members.

In accordance with yet another embodiment of the disclosure, the diverter valve may further comprise a vent port and the valve member may be configured to connect the remaining outlets to the vent port for each operative position of the valve member.

Thus, the present disclosure provides a novel diverter valve for selectively connecting a well servicing apparatus to a plurality of hydrocarbon wells. The well servicing apparatus may comprise, e.g., a pumping system which is used in well fracturing operations. The diverter valve has an inlet which is connected to the pumping system by a single pipe assembly, and a plurality of outlets which are each connected to a corresponding well by respective pipe assemblies. The diverter valve operates to direct high pressure frac fluid from the pumping system to a select one of the wells. Once that well has been stimulated, the diverter valve can be switched to direct the frac fluid to a different well, and so on. In an alternative embodiment, the diverter valve also operates to vent the wells which are not being stimulated in order to prevent a buildup of pressure in those wells. Thus, the diverter valve eliminates the need for an extensive piping system and/or a relatively complex and heavy manifold assembly to connect the pumping system to each well.

These and other objects and advantages of the present disclosure will be made apparent from the following detailed description, with reference to the accompanying drawings. In the drawings, the same reference numbers may be used to denote similar components in the various embodiments.

BRIEF DESCRIPTION OF THE DRAWINGS

FIG. 13 is a cross sectional representation of a further illustrative embodiment of the diverter valve of the present disclosure;

FIG. 13A is an enlarged view of the portion of FIG. 13 labeled 13A;

FIG. 14 is a perspective representation of an assembly of diverter valves of the type shown in FIG. 6;

FIG. 30 is a perspective representation of a well fracking site showing the diverter valve of the present disclosure connected to four frac trees using flexible outlet pipes.

DETAILED DESCRIPTION OF THE DISCLOSURE

The present disclosure is directed to a diverter valve for selectively connecting a well servicing apparatus to one of a plurality of hydrocarbon wells. The well servicing apparatus may comprise, e.g.; a pumping system which is used in well fracturing operations. The diverter valve has an inlet which is connected to the pumping system by a single pipe assembly and a plurality of outlets which are each connected to a corresponding well by respective pipe assemblies. The diverter valve operates to direct high pressure frac fluid from the pumping system to a select one of the wells. Once that well has been stimulated, the diverter valve can be switched to direct the frac fluid to a different well, and so on. In one embodiment, the diverter valve also operates to vent the wells which are not being stimulated in order to prevent a buildup of pressure in those wells. Thus, the diverter valve eliminates the need for an extensive piping system and/or a relatively complex and heavy manifold assembly to connect the pumping system to each well, Although the diverter valve of the present disclosure may be used with various well servicing apparatuses and in a number of well service operations, for purposes of simplicity it will be described herein in the context of a well fracturing operation in which the diverter valve is used to connect a pumping system to a plurality of hydrocarbon wells.

Figure 1:
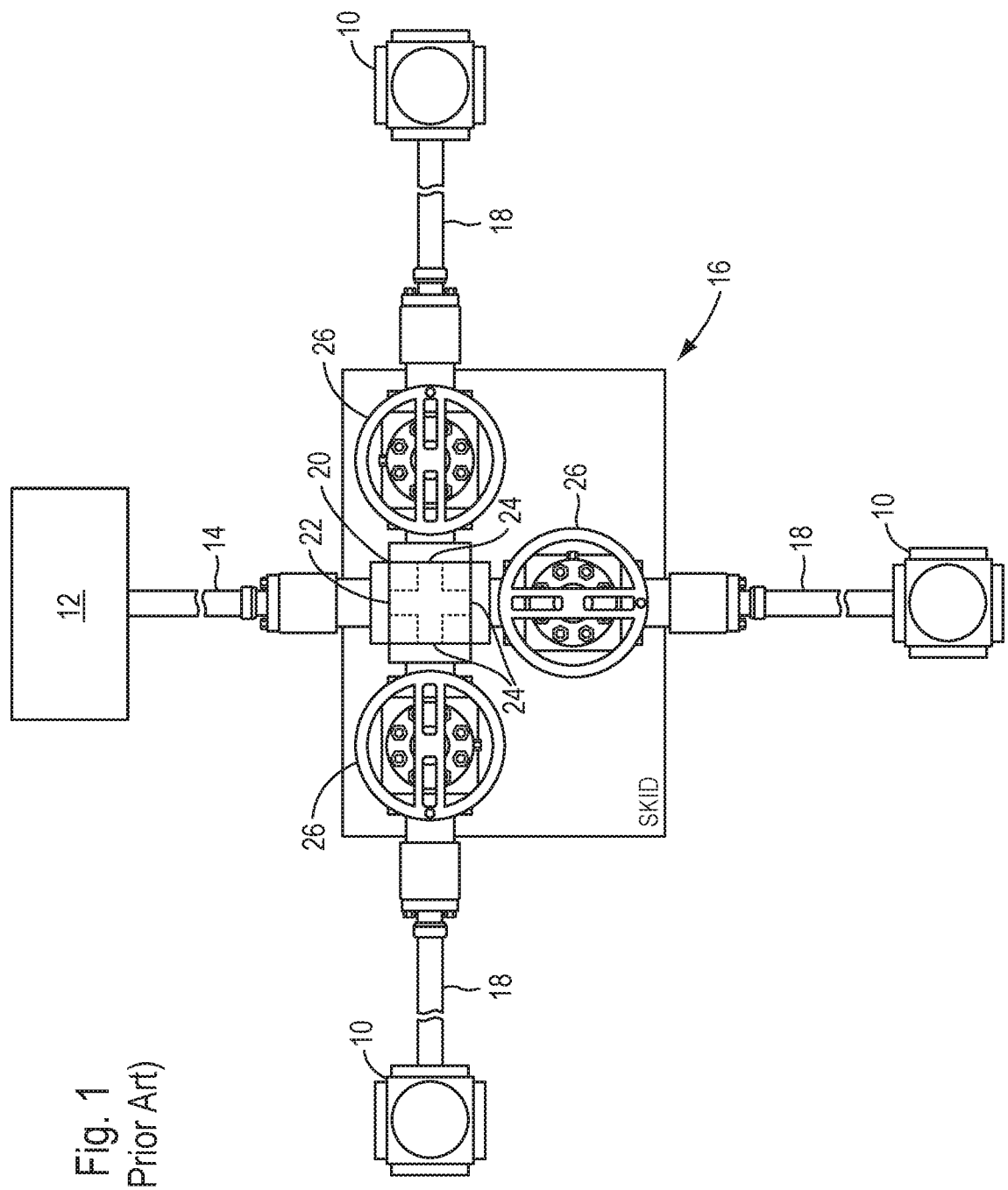
FIG. 1 is a schematic representation of a prior art frac transfer manifold assembly.
Figure 2:
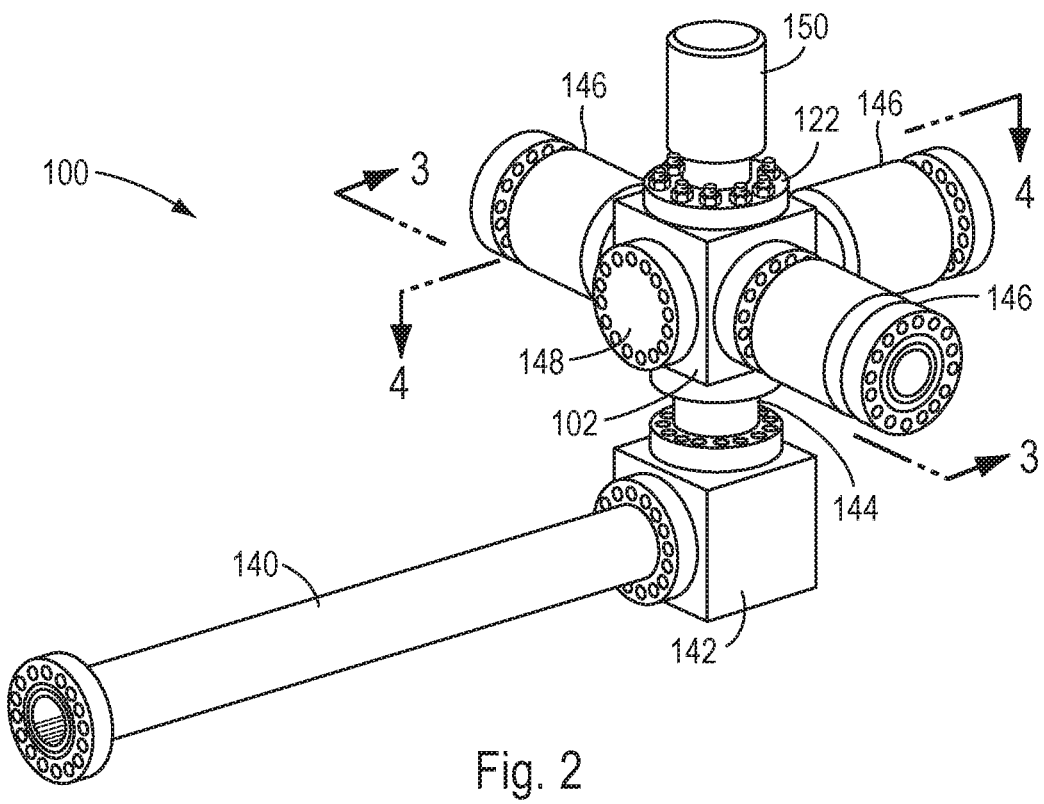
FIG. 2 is a perspective view of a first illustrative embodiment of the diverter valve of the present disclosure.
Figure 3:
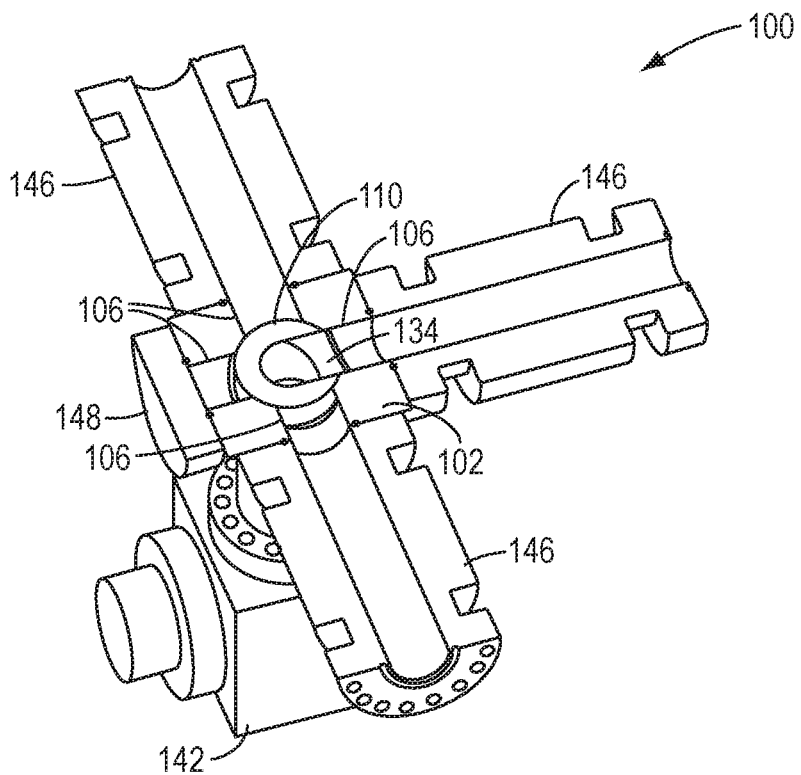
FIG. 3 is a is a cross sectional view of the diverter valve of FIG. 2 taken along the line 3-3.
Figure 4:
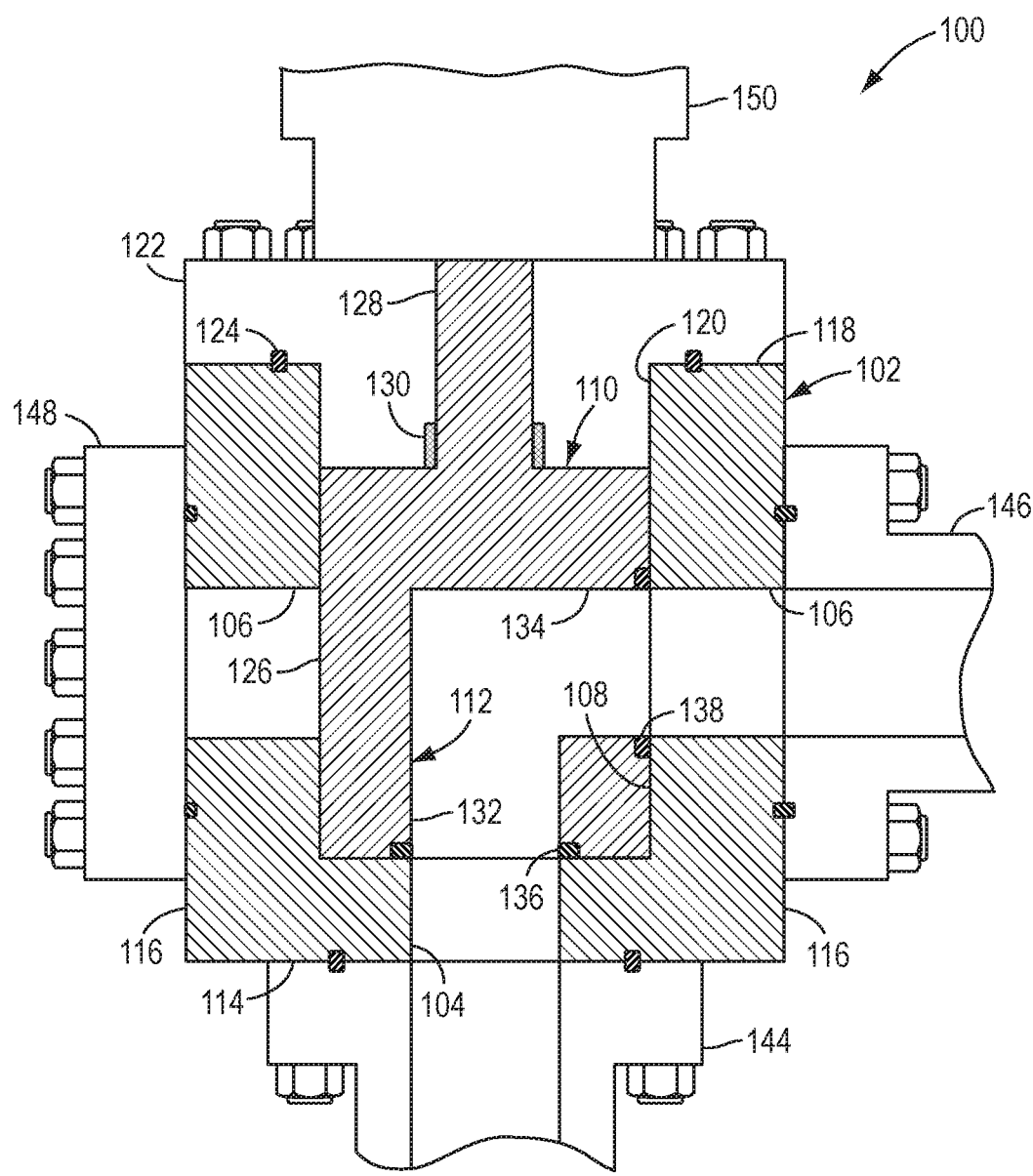
FIG. 4 is a cross sectional representation of the diverter valve of FIG. 2 taken along the line 4-4.

A first illustrative embodiment of the diverter valve of the present disclosure is shown in FIGS. 2-4. The diverter valve of this embodiment, generally 100, comprises a valve body 102 which includes an inlet 104, a plurality of outlets 106 (in this example four), and an internal cavity 108 to which the inlet and outlets are connected. The diverter valve 100 also includes a valve member 110 which is movably received in the cavity 108 and comprises a through bore 112 that is configured to connect the inlet 104 with a corresponding one of the outlets 106 depending on the operative position of the valve member. In operation of the diverter valve 100, the valve member 110 is movable between its operative positions to selectively connect the inlet 104 with any one of the outlets 106. In this regard, the term "operative position" can be interpreted to mean any position of the valve member in which the through bore 112 is connected to an outlet 106. Thus, in the diverter valve 100, the valve member 110 has four operative positions.

In the embodiment of the disclosure shown in FIGS. 2-4, the valve body 102 comprises a generally rectangular block configuration which includes a bottom 114, four sides 116, and a top 118 having an opening 120 which is connected to the cavity 108 (FIG. 4). In this embodiment, a bonnet or cap member 122 is bolted or otherwise removably connected to the valve body 102 over the opening 120 and is sealed to the valve body by a suitable seal 124. Also, the inlet 104 is located in the bottom 114 of the valve body 102, and each of the four outlets 106 is located in a corresponding side 116 of the valve body.

As shown in FIGS. 2-4, the valve member 110 comprises a cylindrical body portion 126 which is rotatably received in the cavity 108 and a valve stem 128 which extends axially from the body portion. The valve stem 128 extends through a corresponding opening in the cap member 122 as is sealed thereto by a suitable seal 130. In addition, the through bore 112 of the valve member 110 includes an inlet branch 132 which is connected to the inlet 104 and an outlet branch 134 which is connectable to one of the outlets 106 depending on the operative position of the valve member 110. In this embodiment, the inlet branch 132 includes an upstream end which defines a first end of the through bore and the outlet branch includes a downstream end which defines a second end of the through bore. The inlet branch 132 may be sealed to the inlet 104 by a suitable seal 136, and the outlet branch 134 may be sealed to each outlet 106 by an appropriate seal 138. In operation, fluid which enters the diverter valve 100 through the inlet 104 flows through the through bore 112 and into the outlet 106 to which the outlet branch 134 is aligned.

In use, the inlet 104 is connected to the pumping system using an inlet pipe assembly, and each outlet 106 is connected to a respective well using a corresponding outlet pipe assembly. As shown best in FIG. 2, the inlet pipe assembly may for instance be connected to the inlet 104 through a pup joint 140, a block elbow 142 and a pipe spool 144. In addition, each outlet pipe assembly may be connected to a respective outlet 106 using a connecting spool 146. In the event an outlet 106 is not required for a particular fracturing operation, that outlet may be closed off using a blind flange 148.

In operation, once the inlet pipe assembly has been connected between the inlet 104 and the pumping system and each outlet pipe assembly has been connected between a respective outlet 106 and a corresponding well, the diverter valve 100 may be used to connect the pumping system to one of the wells by rotating the valve member 110 until the outlet branch 134 is aligned with the outlet 106 to which that well is connected. Frac fluid from the pumping system will thus be directed to the well through the inlet pipe assembly, the inlet 104, the through bore 112 in the valve member 110, the outlet 106 and the outlet pipe assembly. The valve member 110 may be rotated manually or, as shown in FIG. 2, using an electric or hydraulic valve actuator 150. After the fracturing operation has been completed on that well, the pumping system can be connected to another well by simply rotating the valve member 110 until the outlet branch 134 is aligned with the outlet 106 of that well. This process can be repeated until all of the wells to which the diverter valve 100 is connected have been stimulated.

In the illustrative embodiment of the disclosure shown in FIGS. 2-4, the diverter valve 100 has four outlets 106. Thus, up to four wells may be connected to the diverter valve 100. However, in other embodiments the diverter valve 100 may have fewer or more than four outlets 106. Also, if the number of outlets 106 exceeds the number of wells, any unused outlets can be closed off with a blind flange 148. In this event, positioning the valve member 110 so that the outlet branch 134 is aligned with the outlet 106 to which the blind flange 148 is connected will operate to close the diverter valve 100.

If desired, multiple diverter valves 100 may be connected together in order to connect the pumping system to more wells than are possible with a single diverter valve. In the embodiment shown in FIG. 5, for example, three diverter valves 100a, 100b, 100c are connected in series and mounted on an optional support surface 152, such as a skid. In this example, the inlet of the first diverter valve 100a is connected to the pumping system (not shown) via a pup joint 140a, a block elbow 142a and a pipe spool 144a, an outlet of the first diverter valve is connected via a first pipe assembly 154, a second block elbow 142b and a second pipe spool 144b to the inlet of the second diverter valve 100b, and an outlet of the second diverter valve is connected via a second pipe assembly 156, a third block elbow 142c and a third pipe spool 144c to the inlet of the third diverter valve 100c. Of course, any suitable combination of pipe components and connectors may be used to connect the diverter valves together. Also, any number of diverter valves may be connected together, and the diverter valves may be connected together other than in series.

Figure 5:
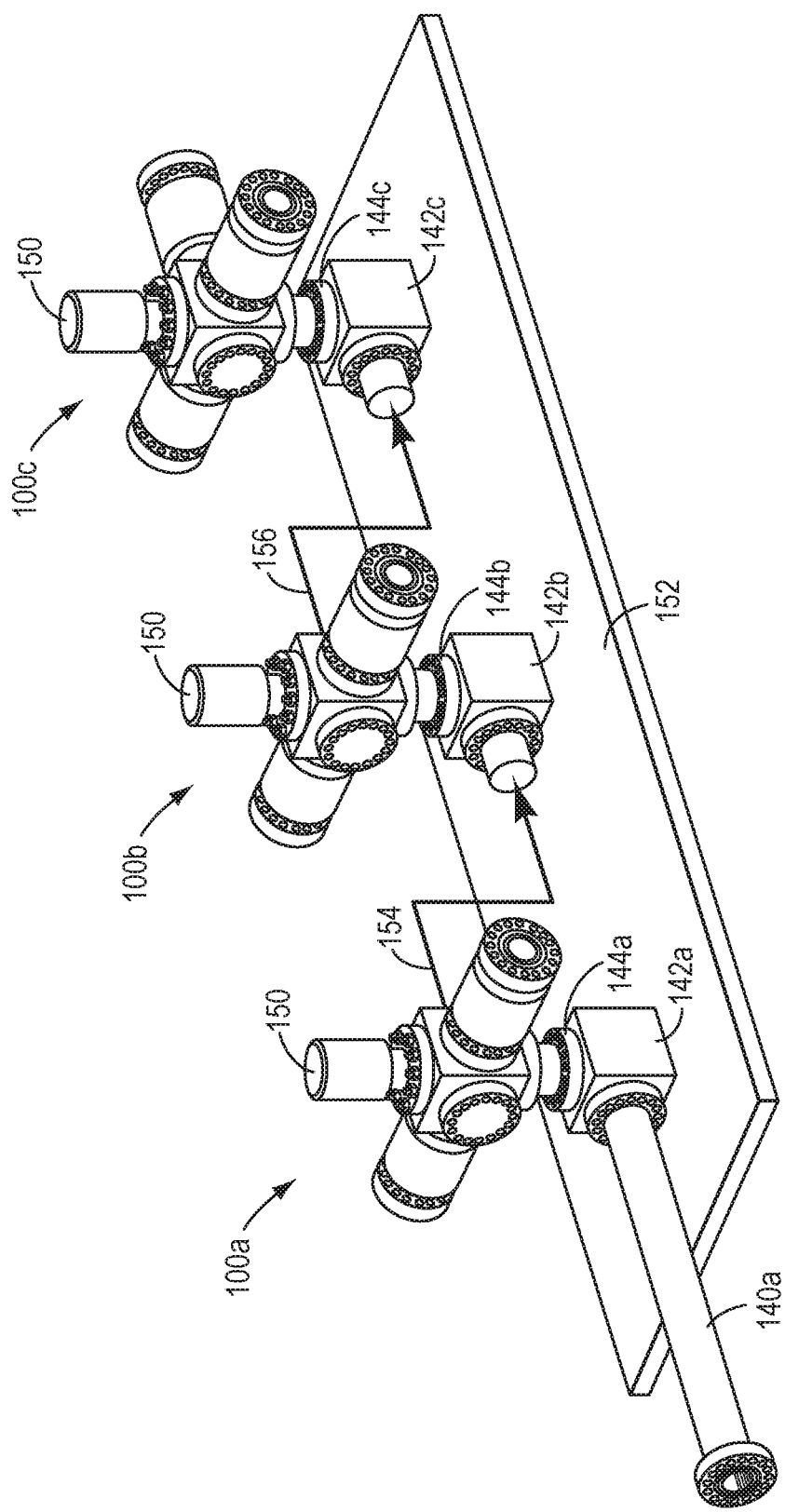
FIG. 5 is a perspective representation of an assembly of diverter valves of the type shown in FIG. 2.

The specific assembly of diverter valves shown in FIG. 5 is capable of connecting the pumping system to ten separate wells. In order to directly connect the pumping system to one of the wells to which the first diverter valve 100a is connected, the outlet branch 134 of the valve element 110 of the first diverter valve is aligned with the outlet to which that well is connected. In this position, the pumping system will be closed off from the other outlets of the first diverter valve 100a as well as all of the outlets of the second and third diverter valves 100b, 100c.

In order to directly connect the pumping system to one of the wells to which the second diverter valve 100b is connected, the outlet branch 134 of the valve element 110 of the first diverter valve 100a is aligned with the outlet 106 to which the first pipe assembly 154 is connected, and the outlet 134 branch of the valve element 110 of the second diverter valve 100b is aligned with the outlet to which the desired well is connected. In this position, the pumping system will be closed off from the other outlets of the second diverter valve 100b as well as all of the outlets of the first and third diverter valves 100a, 100c.

In order to connect the pumping system to one of the wells to which the third diverter valve 100c is connected, the outlet branch 134 of the valve element 110 of the first diverter valve 100a is aligned with the outlet 106 to which the first pipe assembly 154 is connected, the outlet branch of the valve element of the second diverter valve 100b is aligned with the outlet to which the second pipe assembly 156 is connected, and the outlet branch of the valve element of the third diverter valve 100b is aligned with the outlet to which the desired well is connected. In this position, the pumping system will be closed off from the other outlets of the third diverter valve 100a as well as all of the outlets of the first and second diverter valves 100a, 100b.

Figure 6:
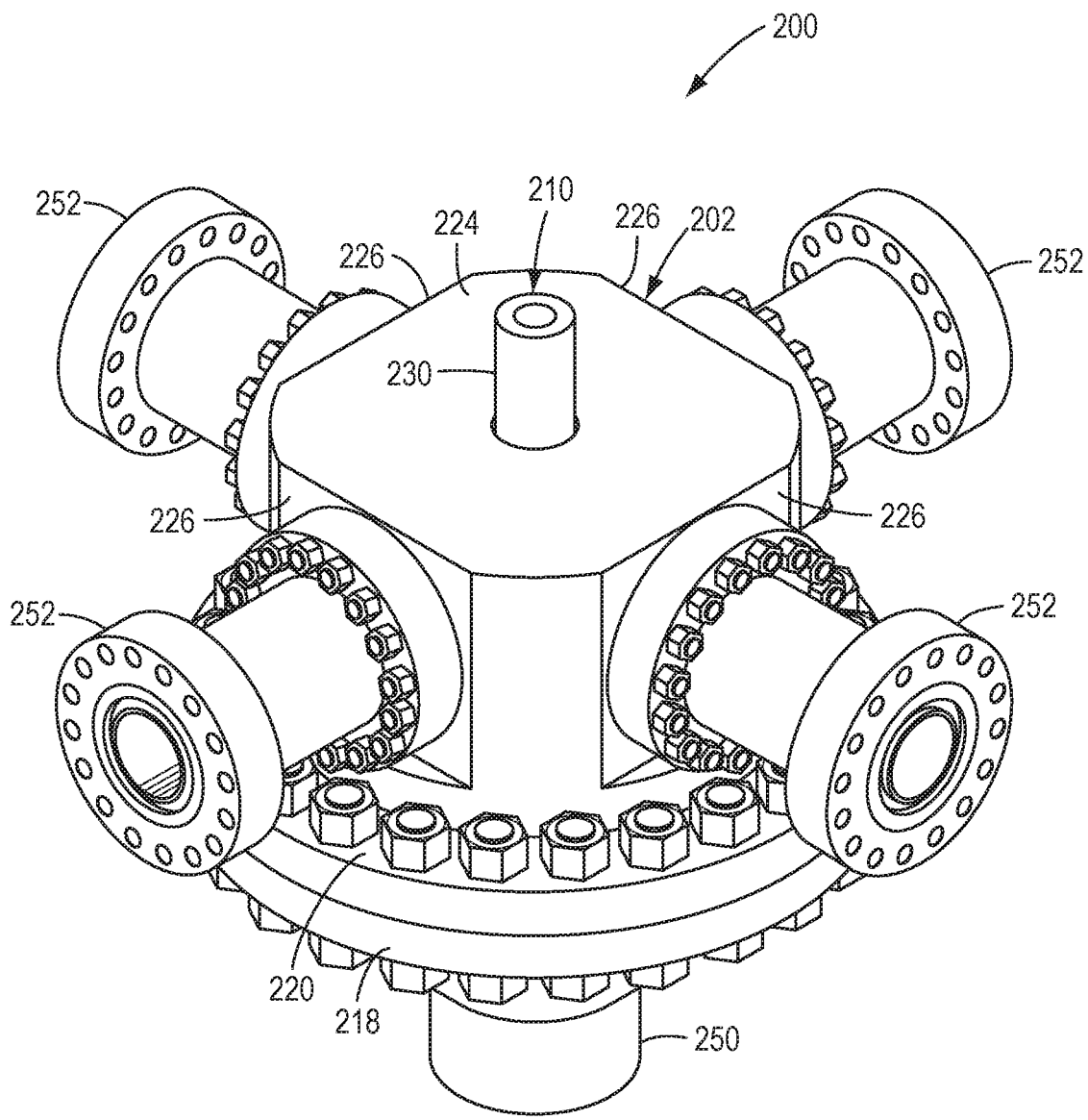
FIG. 6 is a perspective view of another illustrative embodiment of the diverter valve of the present disclosure.
Figure 7:
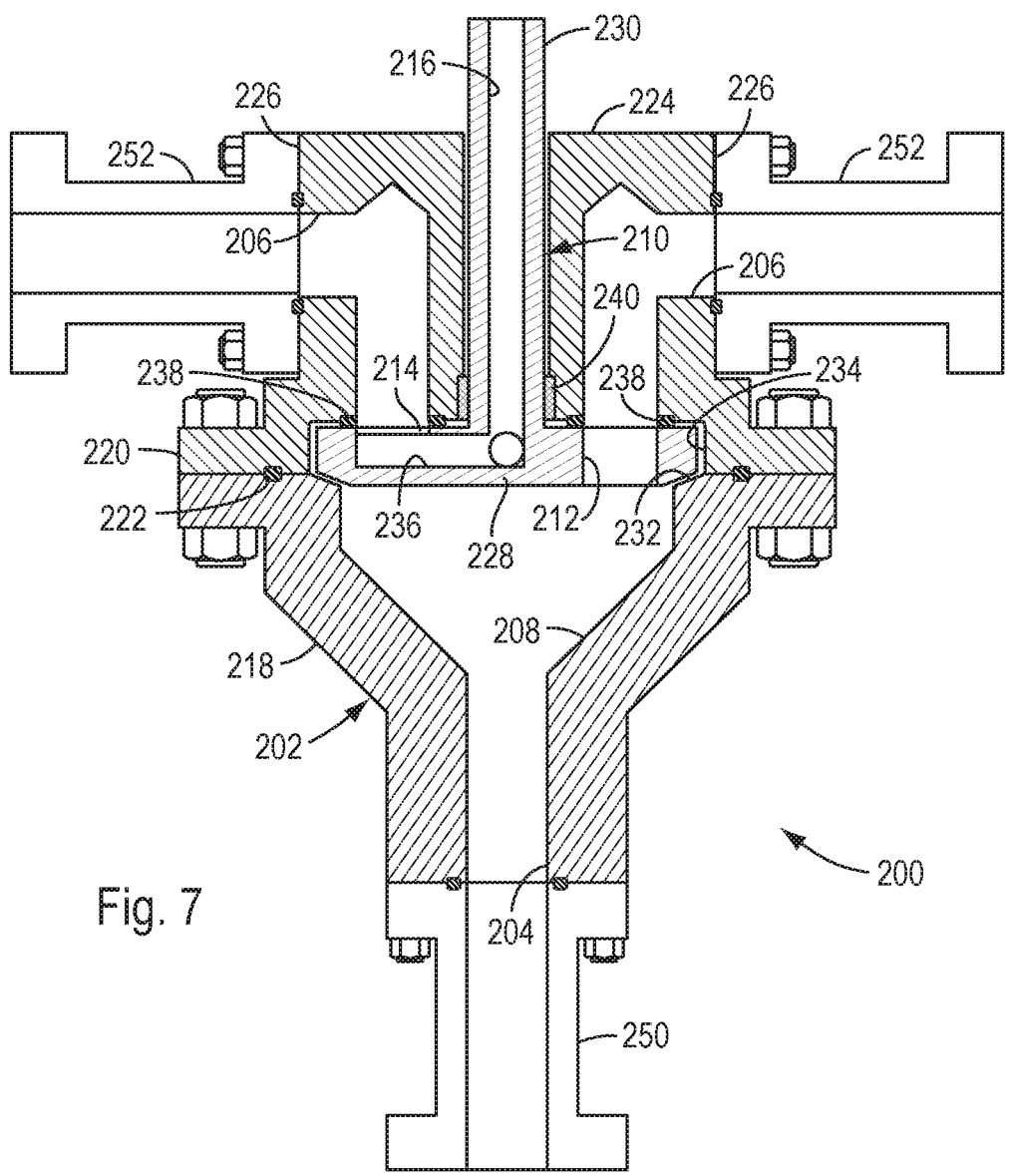
FIG. 7 is a cross sectional representation of the diverter valve shown in FIG. 6.
Figure 8:
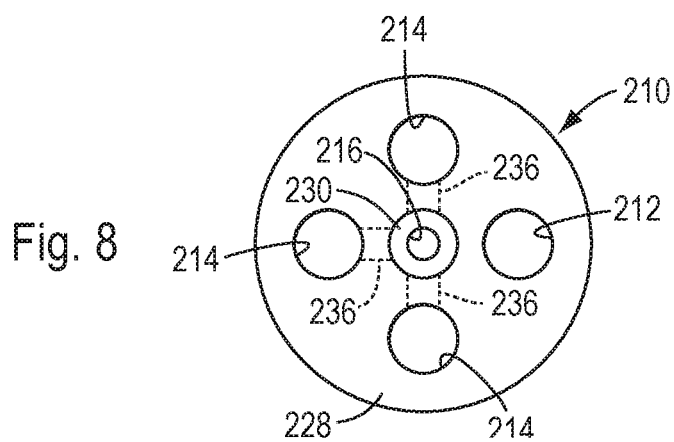
FIG. 8 is a top plan representation of the valve element of the diverter valve shown in FIG. 7.

A second illustrative embodiment of the diverter valve of the present disclosure is shown in FIGS. 6-8. The diverter valve of this embodiment, generally 200, includes a valve body 202 having an inlet 204, a plurality of outlets 206 (in this case four), and an internal cavity 208 to which the inlet and outlets are connected. The diverter valve 200 also includes a valve member 210 which is movably received in the cavity 208. In this embodiment, the valve member 210 includes an inlet bore 212 which is configured to connect the inlet 204 with any one of the outlets 206, a plurality of vent bores 214 which are configured to be connected to the remaining outlets, and a vent port 216 which is configured to connect the vent bores to a location external of the diverter valve 200, such as the atmosphere. In this embodiment, the inlet bore 212 defines the through bore of the valve member 210 through which fluid is conveyed from the inlet 204 to the outlets 206. In addition, inlet bore 212 includes an upstream end which defines a first end of the through bore and a downstream end which defines a second end of the through bore.

In operation of the diverter valve 200, the valve member 210 is movable to selectively connect the inlet bore 212 with one of the outlets 206, which action will simultaneously connect the vent port 216 to the remaining outlets. In this manner, while a stimulation or other operation is being performed on the well which is connected to the inlet 204, the remaining wells can be vented through the vent port 216.

In the embodiment of the disclosure shown in FIGS. 6-8, the valve body 202 comprises a lower body section 218 in which the inlet 204 is located and an upper body section 220 in which the outlets 206 are located. The upper body section 220 is bolted or otherwise connected to the lower body section 218 and is sealed thereto by a suitable seal 222 (FIG. 7). As shown best in FIG. 6, the upper body section 220 of the illustrated embodiment comprises a generally rectangular block configuration having a relatively flat top 224 and four major sides 226, and each of the four outlets 206 is located in a corresponding major side.

Referring again to FIGS. 7 and 8, the valve member 210 of the present embodiment comprises a disk shaped body portion 228 which is rotatably received in the cavity 208, and a valve stem 230 which extends axially from the body portion through a corresponding bore in the upper housing section 220. If desired, the periphery of the body portion 228 may be positioned between an annular ridge 232 formed in the lower housing section 218 and a corresponding recess 234 formed in the upper housing section 220 to help support the valve member 210 in the valve body 202.

In this embodiment, the inlet bore 212 and the vent bores 214 are formed in respective segments of the body portion 228 located between the valve stem 230 and the periphery of the body portion. Also, the vent port 216 extends axially through the valve stem 230, and each outlet bore 214 is connected to the vent port through a corresponding lateral bore 236 in the body portion 228. The inlet bore 212 and the vent bores 214 may be sealed to the outlets 206 by suitable seals 238, and the valve stem 230 may be sealed to the upper body section 220 by an appropriate seal 240. In use, fluid which enters the diverter valve 200 through the inlet 204 flows through the inlet bore 212 and into the outlet 206 to which the inlet bore is connected. At the same time, any fluids which enter the diverter valve 200 through the other outlets 206 are directed into the vent bores 214 to which those outlets are connected, through the lateral bores 236 and into the vent port 216, from where the fluids may be vented to the atmosphere or any other suitable location.

Figure 9:
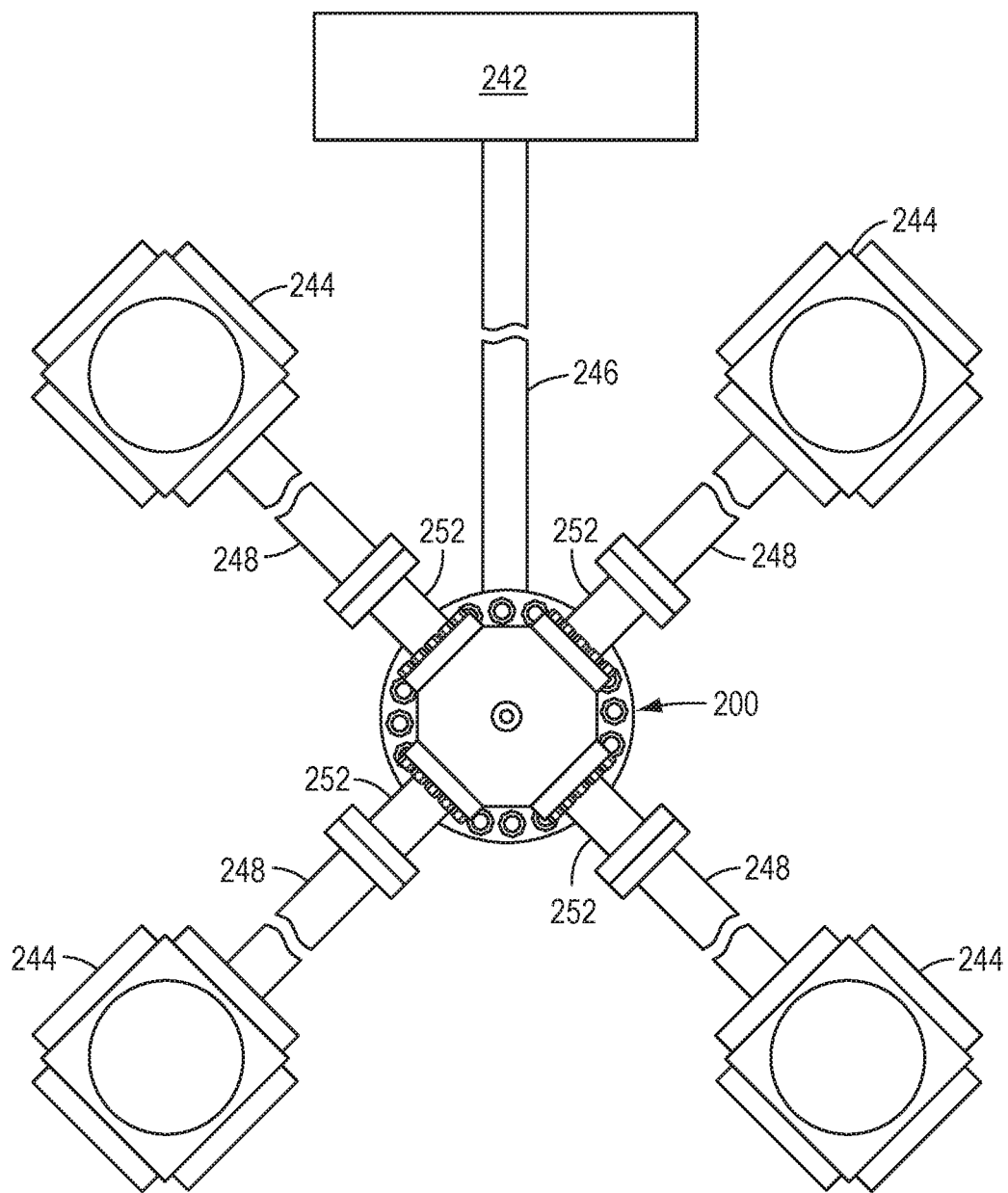
FIG. 9 is a schematic representation of the diverter valve of FIG. 6 shown connected between a conventional pumping system and four wells.

An example of the use of the diverter valve 200 of the present disclosure in a fracturing operation is illustrated in FIG. 9. In this example, the diverter valve 200 is connected between a conventional pumping system 242 and four wells on which respective frac trees 244 are installed. Specifically, the inlet 204 of the diverter valve 200 is connected to the pumping system 242 using an appropriate inlet pipe assembly 246, and each outlet 206 is connected to a respective frac tree 244 using a suitable outlet pipe assembly 248. Although not required, the inlet pipe assembly 246 may be connected to the inlet 204 via an inlet spool 250 (FIG. 7), and each outlet pipe assembly 248 may be connected to its corresponding outlet 206 using an outlet spool 252 (FIG. 6). Although not shown in FIGS. 6-9, in the event an outlet 206 is not required for a particular fracturing operation, that outlet may be closed off using a blind flange similar to the blind flange 148 discussed above.

In operation, once the inlet pipe assembly 246 has been connected between the inlet 204 and the pumping system 242 and each outlet pipe assembly 248 has been connected between a respective outlet 206 and a corresponding frac tree 244, the diverter valve 200 may be used to connect the pumping system to one of the frac trees by rotating the valve member 210 until the inlet bore 212 is aligned with the outlet to which that frac tree is connected. Frac fluid from the pumping system 242 will thus be directed to the well through the inlet pipe assembly 246, the inlet 204, the inlet bore 212, the outlet 206, the outlet pipe assembly 248 and the frac tree 246 which is installed on the well. After the fracturing operation has been completed on that well, the pumping system 242 can be connected to another well by simply rotating the valve member 210 until the inlet bore 212 is aligned with the outlet 206 which is connected to the frac tree 244 that is installed on the well. This process can be repeated until all the wells to which the diverter valve 200 is connected have been stimulated.

In accordance with the present disclosure, while a stimulation operation is being performed on one of the wells to which the diverter valve 200 is connected, the other wells are vented through the vent port 216 in the diverter valve. In particular, pressure in each well which is not undergoing stimulation is vented through its corresponding frac tree 244 and outlet pipe assembly 248 to the outlet 206 to which the outlet pipe assembly is connected. From the outlet 206, the pressure is vented through the vent bore 214 to which the outlet is connected, the lateral bore to which the vent bore 214 is connected, and the vent port 216. In this manner, pressure is prevented from building up in the wells which are not undergoing stimulation.

In the embodiment of the disclosure shown in FIGS. 6-9, the diverter valve 200 has four outlets 206. Thus, up to four wells may be connected to the diverter valve 200. However, in other embodiments the diverter valve 200 may have fewer or more than four outlets 206. Also, if the number of outlets 206 exceeds the number of wells, any unused outlets can be closed off with a blind flange similar to the blind flange 148 discussed above. In this event, positioning the valve member 210 so that the inlet bore 212 is aligned with the outlet 206 to which the blind flange is connected will operate to close the diverter valve 200.

Figure 10:
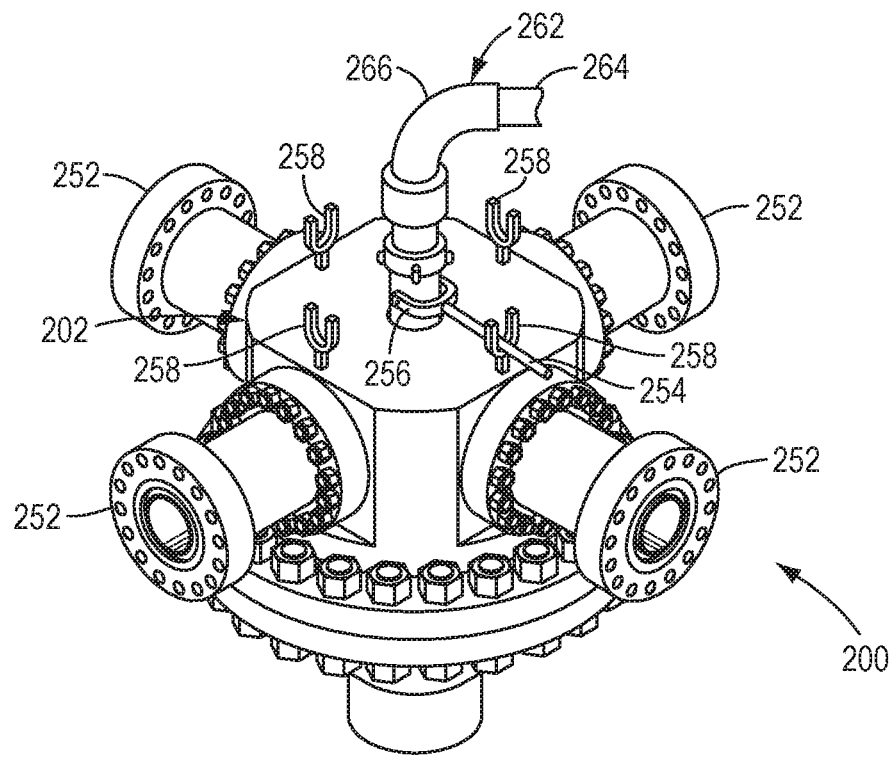
FIG. 10 is a perspective representation of the diverter valve of FIG. 6 including an example of a valve actuator arrangement.

Similar to the diverter valve 100 discussed above, the valve member 210 may be rotated manually or using an electric or hydraulic valve actuator. Referring to FIG. 10, for example, the diverter valve 200 is shown to comprise means for manually rotating the valve member 210. In this embodiment, the means for manually rotating the valve member 210 comprises a lever 254 which is connected to a clevis 256 that in turn is connected to the valve stem 230. In addition, the diverter valve 200 includes a number of detents or retainers 258, each of which is connected to or formed integrally with the valve body 202 in alignment with a corresponding outlet 206. In this example, the clevis 256 is connected to the valve stem 230 such that, when the lever 254 is seated in a particular retainer 258, the inlet bore 212 is connected to the outlet 206 which is aligned with that retainer. Thus, the lever 254 will provide a visual indication of the outlet 206 to which the inlet bore 212 is connected. Also, in this embodiment the clevis 256 is preferably pivotally connected to the valve stem 230 to enable the lever 254 to be lifted out of and lowered into the retainers 258.

Figure 11:
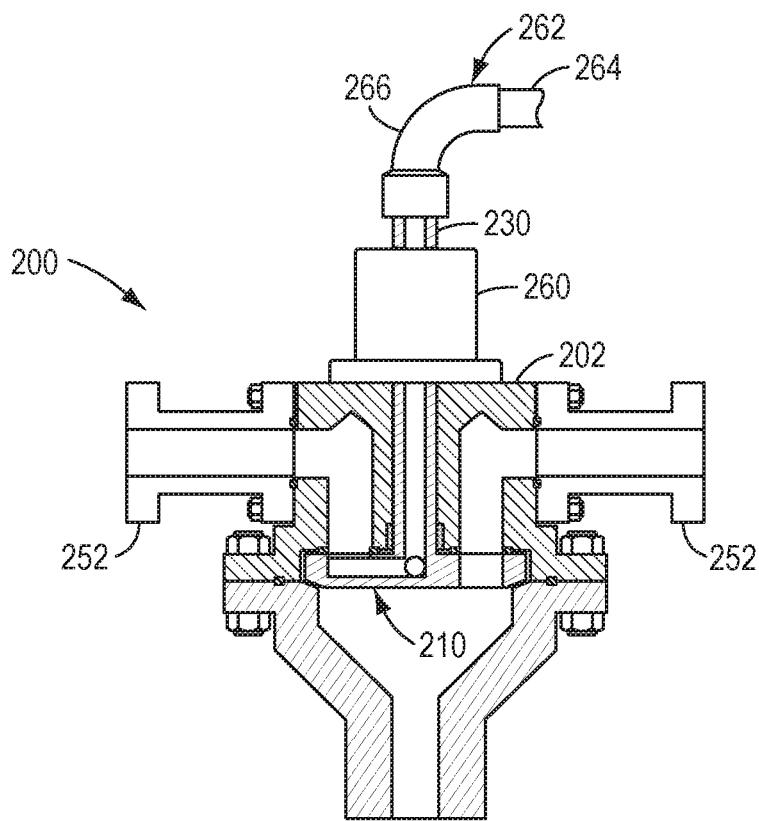
FIG. 11 is a cross sectional representation of the diverter valve of FIG. 6 including another example of a valve actuator arrangement.

Referring to FIG. 11, the diverter valve 200 may alternatively comprise an electric or hydraulic actuator 260 for rotating the valve member 210. In this embodiment, the body of the actuator 260 may be bolted or otherwise secured to the valve body 202, and the drive component of the actuator may be connected to the valve stem 230 via a suitable drive train (not shown). Such an arrangement would allow the diverter valve 200 to be operated remotely, if desired.

In another embodiment of the present disclosure, a vent pipe assembly may be employed to convey the well pressure which exits the vent port 216 to a remote location, such as a mud pit. Referring again to FIGS. 10 and 11, the vent pipe assembly 262 includes a length of tubing 264 (only a portion of which is shown) which is connected to the top of the valve stem 230 via a swivel joint 266. In this manner, the valve stem 230 may be rotated without interference from the vent pipe assembly 262. During use of the diverter valve 200, well pressure which is vented through the vent port 216 will be conveyed through the vent pipe assembly 262 to the remote location.

Figure 12:
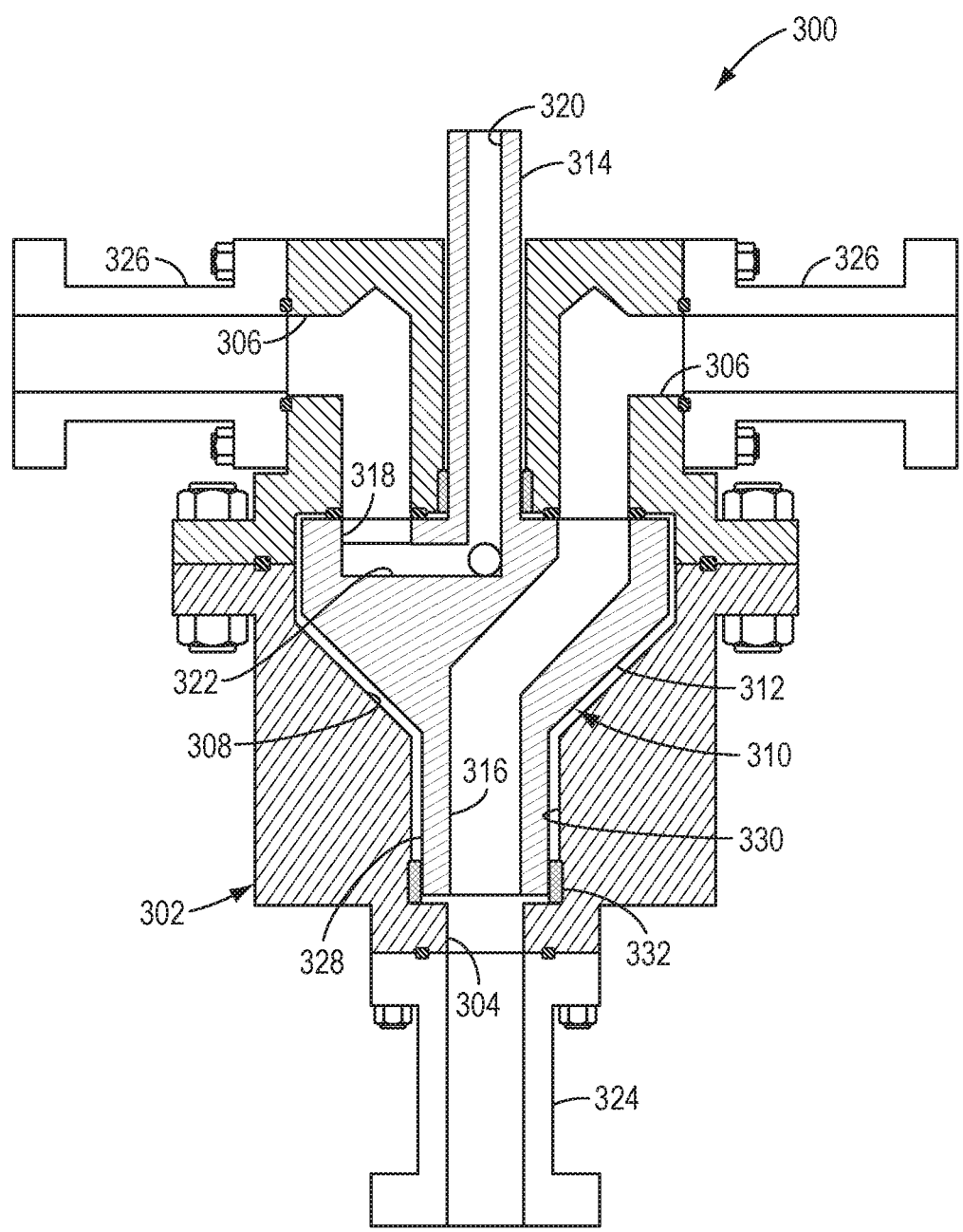
FIG. 12 is a cross sectional representation of yet another illustrative embodiment of the diverter valve of the present disclosure.
Figure 15:
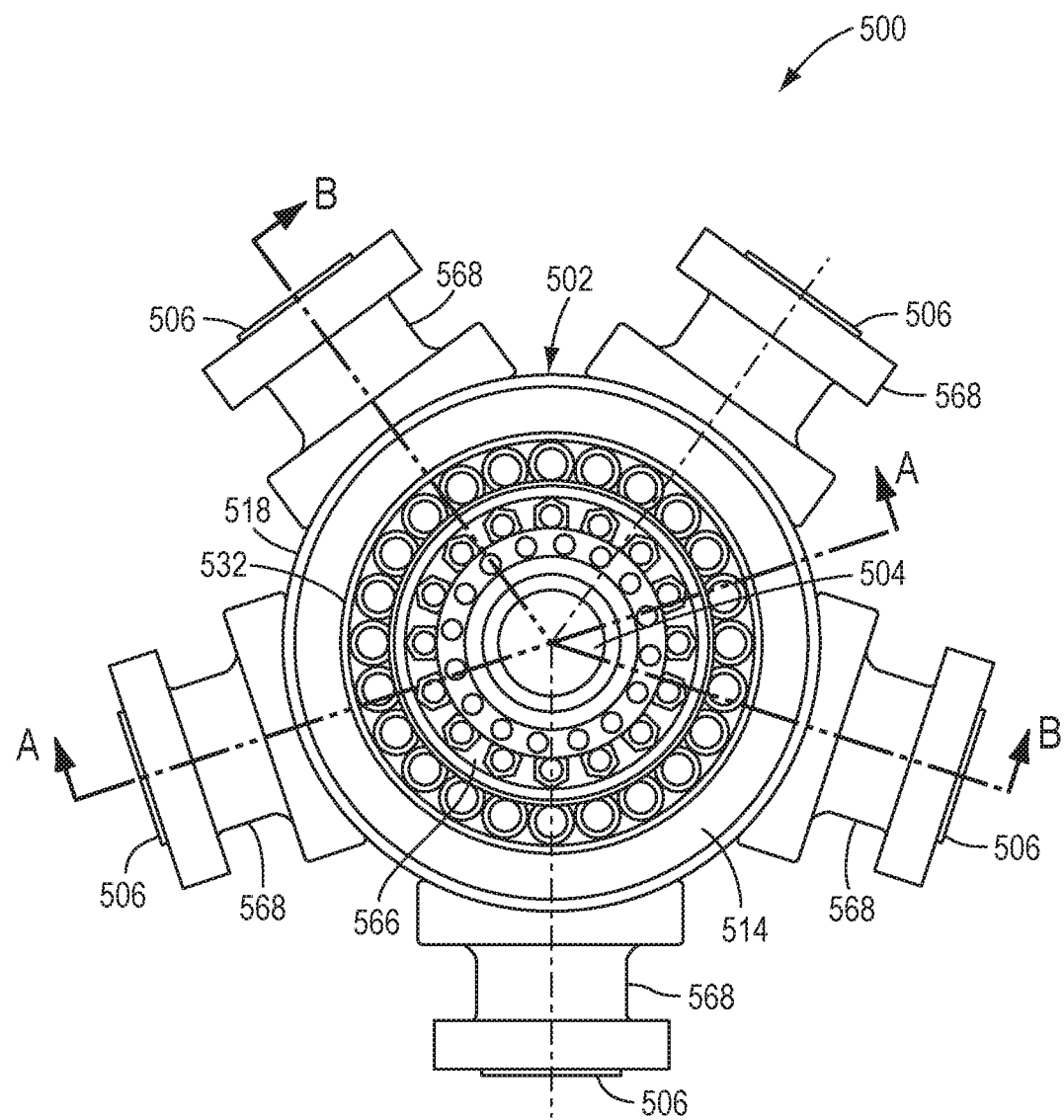
FIG. 15 is a bottom plan view of another illustrative embodiment of the diverter valve of the present disclosure.

Another embodiment of the diverter valve of the present disclosure is shown in FIG. 12. The diverter valve of this embodiment, generally 300, is similar in many respects to the diverter valve 200 just described. Accordingly, the diverter valve 300 comprises a valve body 302 which includes an inlet 304, a number of outlets 306, and an internal cavity 308 to which the inlet and outlets are connected. The diverter valve 300 also includes a valve member 310 which comprises a body portion 312 that is movably positioned in the cavity 308, a valve stem 314 that extends axially from the body portion through a corresponding aperture in the valve body 302, an inlet bore 316 which extends through the body portion and is configured to connect the inlet 304 with any one of the outlets 306, a plurality of vent bores 318 which are configured to be connected to the remaining outlets, a vent port 320 which extends axially through the valve stem 314, and a plurality of lateral bores 322 which are each configured to connect the vent port to a corresponding vent bore. In this embodiment, the inlet bore 316 defines the through bore of the valve member 310 through which fluid is conveyed from the inlet 304 to the outlets 306. In addition, inlet bore 316 includes an upstream end which defines a first end of the through bore and a downstream end which defines a second end of the through bore.

Similar to the diverter valve 200 discussed above, in operation of the diverter valve 300 the valve member 310 is movable to selectively connect the inlet bore 316 with one of the outlets 306, which action will simultaneously connect the vent bores 318 to the remaining outlets. In this manner, while a stimulation or other operation is being performed on the well which is connected to the inlet 304, the remaining wells can be vented through the vent port 320. As with the previous embodiments, in preparation for the stimulation operation the inlet 304 may be connected to an inlet pipe assembly via an inlet spool 324 and the outlets 306 may be connected to corresponding outlet pipe assemblies via respective outlet spools 326.

In the embodiment of the disclosure shown in FIG. 12, the body portion 312 includes a cylindrical lower section 328 which is received in a corresponding recess 330 in the valve body 302 and is sealed thereto using an appropriate seal 332. The seal 332 thus prevents frac fluid from flowing into the annulus between the valve member 310 and the cavity, which could impede the operation of the diverter valve 300.

A further embodiment of the diverter valve of the present disclosure is shown in FIG. 13. The diverter valve of this embodiment, generally 400, is similar to the diverter valve 300 just described in that it includes a valve body 402 having an inlet 404, a plurality of outlets 406 and an internal cavity 408 to which the inlet and outlets are connected. The diverter valve 400 also includes a valve member 410 which comprises a body portion 412 that is movably positioned in the cavity 408, a valve stem 414 which extends axially from the body portion through a corresponding aperture in the valve body 402, and an inlet bore 416 which extends through the body portion and is configured to connect the inlet with any one of the outlets, depending on the operative position of the valve member. In this embodiment, the inlet bore 416 defines the through bore of the valve member 410 through which fluid is conveyed from the inlet 404 to the outlets 406. In addition, inlet bore 416 includes an upstream end which defines a first end of the through bore and a downstream end which defines a second end of the through bore.

In contrast with the diverter valve 300, however, the diverter valve 400 does not have a vent port which extends through the valve stem 414. Instead, the diverter valve 400 has a vent port 418 which extends through the valve body 402 to the cavity 408. In this arrangement, well pressure which enters the outlets 406 is communicated to the vent port 418 through an annulus 420 which is formed between the valve member 410 and the cavity 408. In order to effect such communication, the inlet bore 416 is not sealed to the outlets 406 by respective seals which are mounted to the valve body 402 around each outlet. Instead, the inlet bore 416 is sealed to each outlet 406 by a single seal 422 which is mounted to the valve member 410 around the inlet bore. Thus, the outlets 406 which are not connected to the inlet bore 416 are fluidly connected to the annulus 420 and thus the vent port 416.

As shown in FIG. 13, the body portion 412 of the valve member 410 includes a cylindrical lower section 424 which is received in a corresponding recess 426 in the valve body 402 and sealed thereto using a seal 428. Referring to FIG. 13A, the seal 428 may comprise a trapezoidal cross section having a long base 430 which forms the inner diameter of the seal and opposing legs 432 which are compressed between the valve body 402 and an adjacent portion of the valve member 410. As shown in FIG. 13A, the seal 428 may be positioned in a seal pocket 434 which is formed in the valve body 402 at the bottom of the recess 426, and the legs 432 may be engaged between the bottom of the seal pocket and the bottom 436 of the valve member. In addition to preventing the frac fluid from entering the annulus 420 between the valve member 410 and the cavity 408, the seal 428 may also serve to seal the annulus below the vent port 418 to thereby define a closed flow path between the outlets 406 and the vent port. Alternatively, the diverter valve 200 may comprise a second seal 438 which is positioned between the valve member 410 and the cavity 408 below the vent port 418 to define the closed flow path between the outlets 406 and the vent port.

In operation of the diverter valve 400, the valve member 410 is movable to selectively connect the inlet bore 416 with one of the outlets 406, which action will simultaneously connect the remaining outlets to the vent port 418. In this manner, while a stimulation or other operation is being performed on the well which is connected to the inlet 404, the remaining wells can be vented through the vent port 420. In preparation for the stimulation operation, the inlet 404 may be connected to an inlet pipe assembly via an inlet spool 440, the outlets 406 may be connected to corresponding outlet pipe assemblies via respective outlet spools 442, and the vent port 416 may be connected to a vent pipe assembly via a vent spool 444.

If desired, multiple diverter valves 400 may be connected together in order to service more wells than are possible with a single diverter valve. Referring to FIG. 14, for example, three diverter valves 400a, 400b, 400c are connected in series and are mounted on an optional support surface 446, such as a skid. In this example, the inlet of the first diverter valve 400a is connected to the pumping system (not shown) via a pup joint 448, a block elbow 450a and a pipe spool 452a, an outlet of the first diverter valve is connected via a first pipe assembly 454, a second block elbow 450b and a second pipe spool 452b to the inlet of the second diverter valve 400b, and an outlet of the second diverter valve is connected via a second pipe assembly 456, a third block elbow 450c and a third pipe spool 452c to the inlet of the third diverter valve 400c. If desired, the vent ports of the diverter valves 400a, 400b, 400c may be connected, either directly or via corresponding swivel joints 458a, 458b, 458c, to a vent pipe assembly 460.

The assembly of diverter valves depicted in FIG. 14 is capable of servicing ten wells. However, more or fewer diverter valves may be connected together to service different numbers of wells. In addition, although the assembly depicted in FIG. 14 is comprised of multiple diverter valves 400, any number of the diverter valves 200 and 300 described above may be assembled in a similar manner. Also, any suitable combination of pipe components and connectors may be used to connect the diverter valves together, and the diverter valves need not be connected only in series.

A further embodiment of the diverter valve of the present disclosure is shown in FIGS. 15-19. The diverter valve of this embodiment, generally 500, comprises a valve body 502, an inlet 504, a plurality of outlets 506 (in this example five), an internal cavity 508 which is connected to the inlet and the outlets, and a valve member 510 which is movably positioned in the cavity. The valve member 510 comprises a through bore 512 which is configured to connect the inlet 504 with a corresponding one of the outlets 506 depending on the operative position of the valve member. In operation of the diverter valve 500, the valve member 510 is movable between its operative positions to selectively connect the inlet 504 with one of the outlets 506.

In this particular example, the valve body 502 includes a bottom 514, a top 516 and a generally cylindrical side surface 518. Also, the inlet 504 is located at the bottom 514 of the valve body 502, while the outlets 506 are spaced generally equally around the side surface 516.

The valve member 510 is rotatably supported in the cavity 508 about an axis Z and comprises a spherical portion 520 which is positioned between upper and lower axially extending trunnions 522, 524, In addition, the through bore 512 includes an inlet branch 526 which extends axially through the lower trunnion 524 and an outlet branch 528 which extends laterally through the spherical portion 520. In this embodiment, the inlet branch 526 includes an upstream end which defines a first end of the through bore 512 and the outlet branch includes a downstream end which defines a second end of the through bore.

The valve member 510 may be rotatably supported in the cavity 508 between an upper retainer member 530 and a lower retainer member 532. The upper retainer member 530 may be secured in an access bore 534 which extends through the top 516 of the valve body 502, and the lower retainer member may be secured in an inlet bore 536 which extends through the bottom 514 of the valve body.

Figure 16:
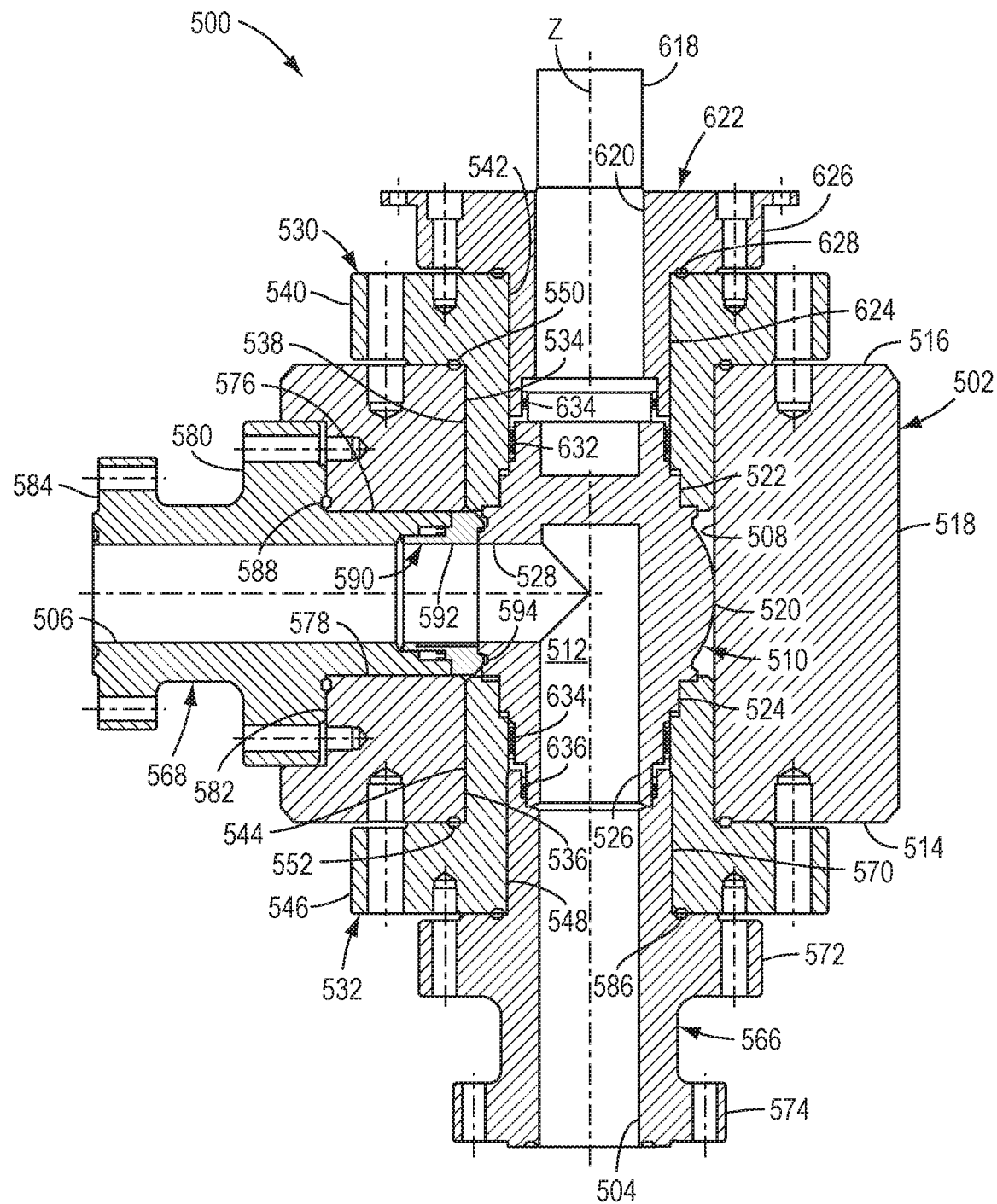
FIG. 16 is a cross sectional view of the diverter valve of FIG. 15 taken along line A-A.
Figure 17:
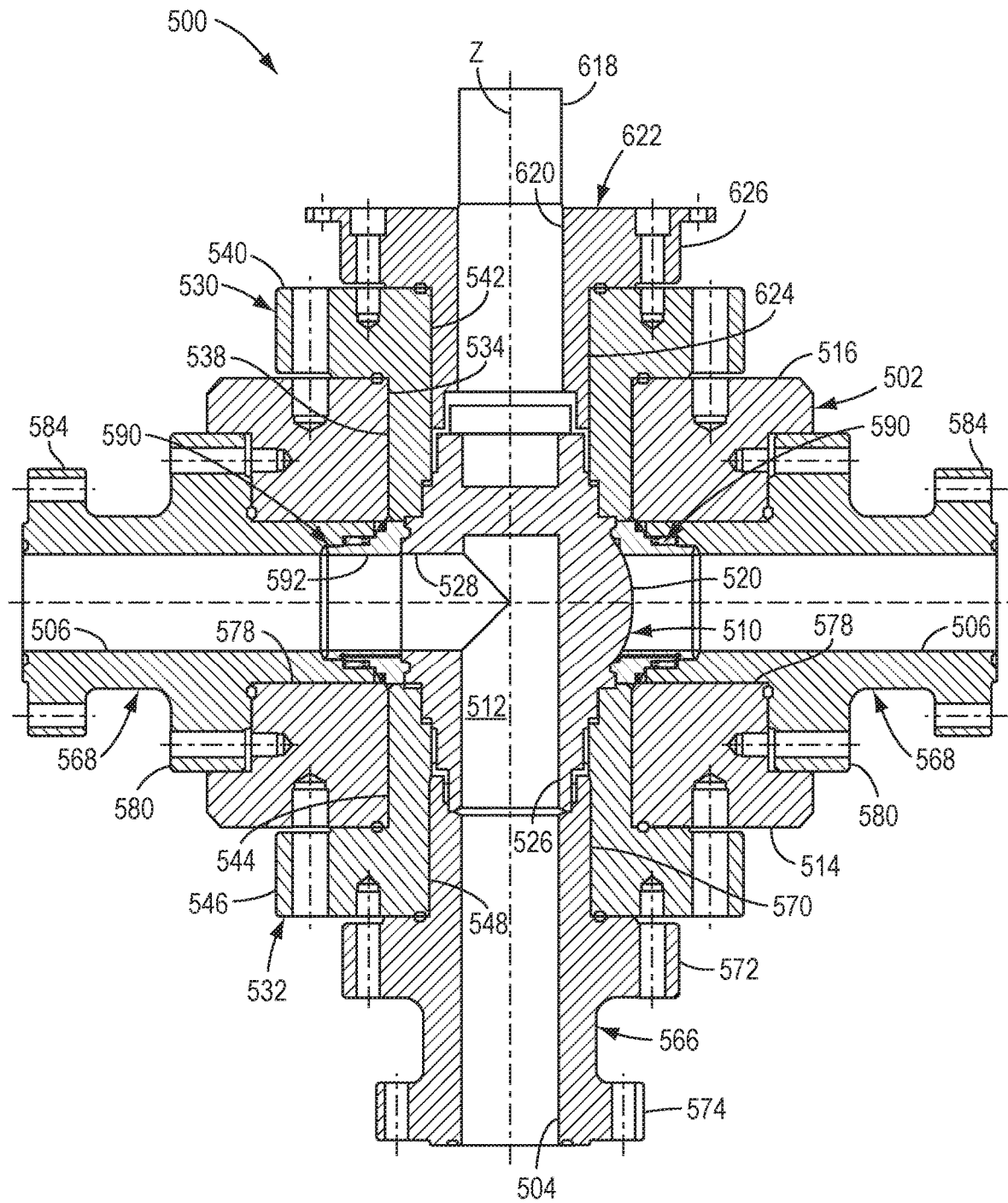
FIG. 17 is a cross sectional view of the diverter valve of FIG. 15 taken along line B-B.
Figure 18:
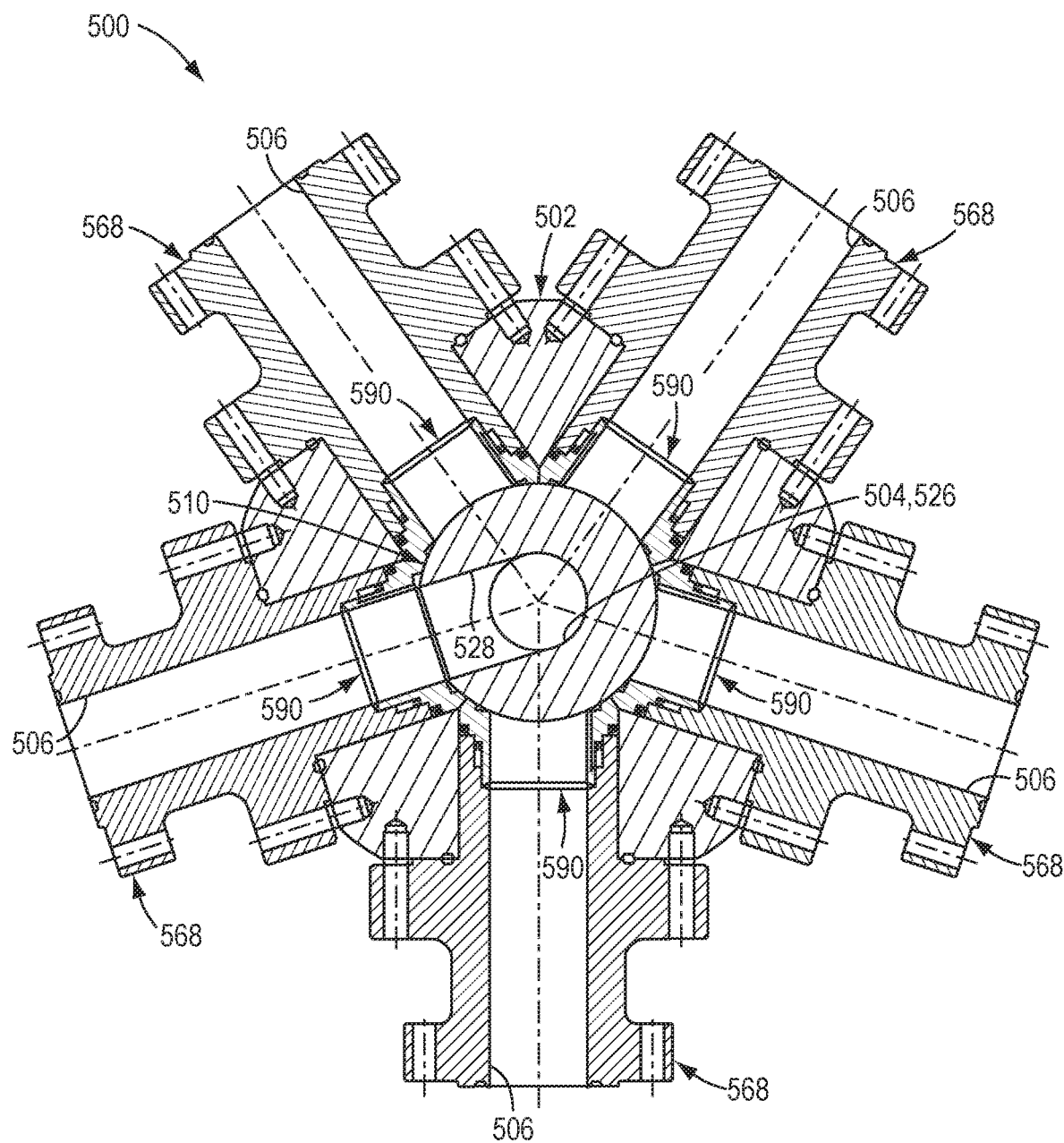
FIG. 18 is a lateral cross sectional view of the diverter valve of FIG. 15 shown looking downward.

More specifically, with referring to FIG. 16, the upper retainer member 530 may include an upper retainer mandrel 538 which is configured to be received in the access bore 534, an upper retainer flange 540 which extends radially from an upper end of the upper retainer mandrel and is configured to be bolted or otherwise connected to the top 516 of the valve body 502, and an upper retainer bore 542 which extends axially through the upper retainer member. Similarly, the lower retainer member 532 may comprise a lower retainer mandrel 544 which is configured to be received in the inlet bore 536, a lower retainer flange 546 which extends radially from a lower end of the lower retainer mandrel and is configured to be bolted or otherwise connected to the bottom 514 of the valve body 502, and a lower retainer bore 548 which extends axially through the lower retainer member.

The upper retainer member 530 may be sealed to the valve body 502 by a suitable seal 550 which may be positioned, e.g., between the upper retainer flange 540 and the top 516 of the valve body, and the lower retainer member 532 may be sealed to the valve body by an appropriate seal 552 which may be positioned, e.g., between the lower retainer flange 546 and the bottom 514 of the valve body.

Figure 19:
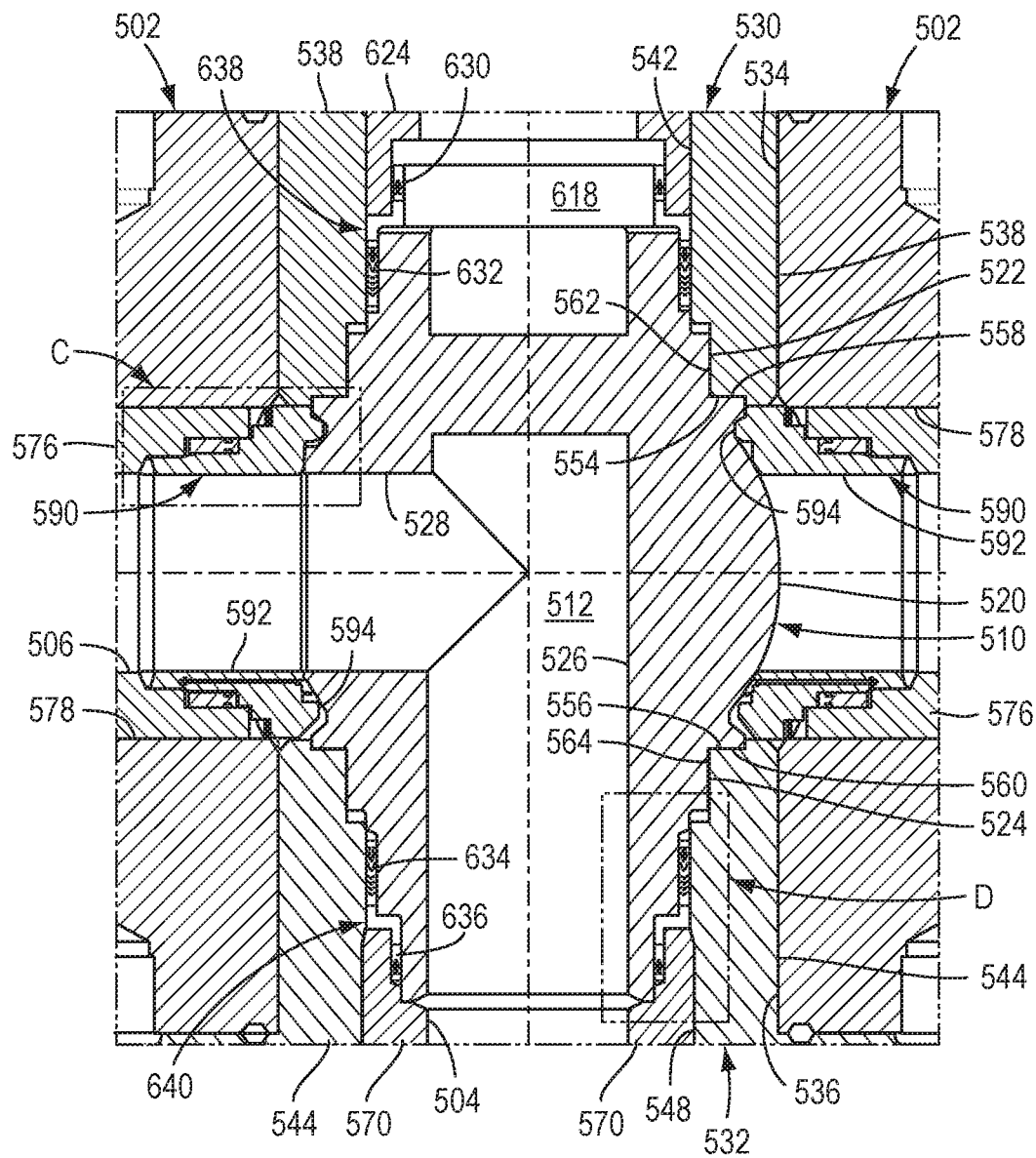
FIG. 19 is an enlarged cross sectional view of the valve member and valve seat components of the diverter valve of FIG. 15.

In one particular embodiment of the disclosure, which is seen best in FIG. 19, the valve member 510 and the upper and lower retainer members 530, 532 may be configured such that the axially inner ends 554, 556 of the upper and lower retainer mandrels 538, 544 engage corresponding upper and lower annular lips 558, 560 which are formed on the valve member between the spherical portion 520 and the upper and lower trunnions 522, 524 of the valve member, respectively. In addition, the upper and lower retainer bores 542, 548 may each comprise an enlarged diameter portion 562, 564 which is configured to receive a corresponding one of the upper and lower trunnions 522, 524. In this manner, the first and second retainer members 530, 532 will prevent both axial and radial movement of the valve member 510 while still allowing the valve member to rotate about the axis Z.

In one particular embodiment of the disclosure, the inlet 504 is formed in an inlet spool 566 which is secured to the bottom 514 of the valve body 502, either directly or, as shown in the figures, via the lower retainer member 532, and the outlets 506 are formed in respective outlet spools 568 which are secured to the side surface 518 of the valve body. Referring to FIG. 16, the inlet spool 566 may include an inlet mandrel 570 which is configured to be received in the lower retainer bore 548, a first inlet flange 572 which extends radially from the inlet mandrel and is bolted or otherwise connected to the lower retainer flange 546, and possibly also a second inlet flange 574 (or some other type of suitable end connection) which extends radially from an axially outer end of the inlet mandrel and is configured to be connected to the inlet pipe assembly (not shown).

Similarly, each outlet spool 568 includes an outlet mandrel 576 which is configured to be received in an outlet bore 578 which is extends through the side surface 518 of the valve body 502 to the cavity 508, a first outlet flange 580 which extends radially from the outlet mandrel and is bolted or otherwise connected to the side surface of the valve body or, as shown in FIG. 16, to a flat mounting surface 582 which is formed in the side surface of the valve body, and possibly also a second outlet flange 584 (or some other type of suitable end connection) which extends radially from an axially outer end of the outlet mandrel and is configured to be connected to a corresponding outlet pipe assembly (not shown). The inlet spool 566 may be sealed to the lower retainer member 532 by a suitable seal 586 which may be positioned, e.g., between the first inlet flange 572 and the lower retainer flange 546, and each outlet spool 568 may be sealed to the valve body 502 by a suitable seal 588 which may be positioned, e.g., between the first outlet flange 580 and the side surface 518 of the valve body or, as shown in FIG. 16, the mounting surface 582.

Figure 20:
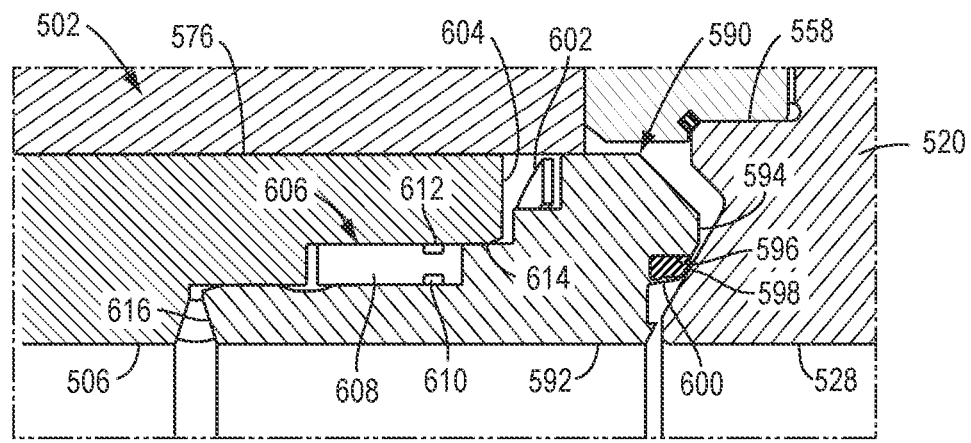
FIG. 20 is an enlarged view of the area of FIG. 19 designated by the arrow C.

The valve member 510 is positioned between a plurality of valve seats 590, each of which is positioned at the intersection of the cavity 508 and a corresponding outlet 506. Each valve seat 590 includes a seat bore 592 which is aligned with the outlet 506 and an annular sealing face 594 which is configured to sealingly engage the spherical portion 520 of the valve member 510. Referring also to FIG. 20, in some embodiments the sealing face 594 may comprise an annular groove 596 within which a circular sealing insert 598 may be positioned. The sealing insert 598 may be made of, e.g., PEEK, and the valve seat 590 may include an annular lip 600 to aid in retaining the insert in the groove 596. A suitable biasing means, such as a Belleville washer or similar spring member 602, may be positioned between the valve seat 590 and an axially inner end 604 of the outlet mandrel 576 in order to bias the sealing face 594, including the sealing insert 598, if present, against the spherical portion 520. Also, the valve seat 590 may be sealed to, e.g., the outlet mandrel 576 by a suitable seal 606, which may, for example, include a cylindrical seal body 608 and a pair of inner and outer circular sealing members 610, 612 which are positioned between the seal body and the valve seat 590 and between the seal body and the outlet mandrel 576, respectively. In some embodiments the seal 606 may be slidably positioned on the valve seat 590.

In certain embodiments, each valve seat 590 may provide bidirectional sealing capability. Referring to FIG. 19, for example, when the valve member 510 is positioned to connect the inlet 504 to an outlet 506 (such as the outlet shown on the left-hand side of FIG. 19), the associated valve seat 590 will seal the cavity 508 from the pressure being communicated to the well to which that outlet is connected. Also, when the valve member 510 is positioned to isolate the inlet 504 from an outlet 506 (such as the outlet shown on the right-hand side of FIG. 19), the associated valve seat 590 will seal the cavity 508 from pressure in the well to which that outlet is connected.

Also, the valve seat 590 and the seal 606 may be configured to provide a double piston effect to force the sealing face 594 into firm sealing engagement with the valve member 510. As shown in FIG. 20, for example, the valve seat 590 may be slidably positioned in the outlet bore 578 and/or a counterbore 614 formed in the axially inner end of the outlet mandrel 576, in which event pressure in the outlet 506 (either the pressure being communicated to the well when the outlet is open or pressure from the well when the outlet is closed) will act on an axially outer end 616 of the valve seat 590 and the axially outer end of the seal body 608 to both force the valve seat axially inwardly against the valve member 510 and force the seal body 608 axially inwardly against the valve seat, which in turn will force the sealing face 594, including the sealing insert 598, if present, into firm sealing engagement with the valve member 510.

In certain embodiments, the seal 606 may also function to seal its associated outlet bore 506 from pressure in the cavity 508. If pressure is present in the cavity 508 (which may occur, e.g., if the lower sealing assembly 640 (described below) or one of the valve seats 590 should fail), this pressure will migrate around the outer surface of the valve seat 590 and be contained by the seal 606. In addition, if the seal 606 is slidably positioned on the valve seat 590, the pressure in the cavity 508 will force the seal axially outwardly against an adjacent axially inwardly facing shoulder in the outlet mandrel 576, which will thus expose the adjacent axially outer facing shoulder of the valve seat 590 to the pressure. This pressure will in turn force the valve seat 590 axially inwardly (to the right as viewed in FIG. 20) to thereby force the sealing face 594, including the sealing insert 598, if present, into firm sealing engagement with the valve member 510.

The double piston effect will thus greatly enhance the ability of the valve seat 590 to maintain tight sealing engagement with the valve member 510. The double piston effect enables each valve seat 590 to act independently and provide dual barriers against the pressure source, whether it be from the inlet 504 or from an outlet 506. Also, in the event a valve seat 590 should leak, the second barrier provided by the seal 606 will prevent undesired pressure communication.

The valve member 510 is rotated between its operative positions by means of a valve stem 618 which extends through a corresponding hole 620 in a valve bonnet 622 that is connected to the valve body 502, either directly or, as shown in FIG. 16, via the upper retainer member 530. In one embodiment, the bonnet 622 includes a bonnet mandrel 624 which is configured to be received in the upper retainer bore 542 and a bonnet flange 626 which extends radially from the bonnet mandrel and is bolted or otherwise connected to the upper retainer flange 540. The bonnet 622 may be sealed to the upper retainer member 530 by a suitable seal 628 which may be positioned, e.g., between the bonnet flange 626 and the upper retainer flange 540.

The diverter valve 500 may comprise suitable means for sealing the cavity 508 from the environment and preferably also from pressure in the inlet 504. For example, the diverter valve 500 may include a first seal 630 for sealing between the valve stem 618 and the bonnet 622, a second seal 632 for sealing between the valve member 510 and the upper retainer member 530, a third seal 634 for sealing between the valve member and the lower retainer member 532, and a fourth seal 636 for sealing between the valve member and the inlet spool 566. As shown in FIG. 19, for instance, the first seal 630 may be positioned between the valve stem 618 and the bonnet mandrel 624, the second seal 632 may be positioned between the upper trunnion 522 of the valve member 510 and the upper retainer mandrel 538, the third seal 634 may be positioned between the lower trunnion 524 of the valve member and the lower retainer mandrel 544, and the fourth seal 636 may be positioned between the lower trunnion of the valve member and the inlet mandrel 570.

Figure 21:
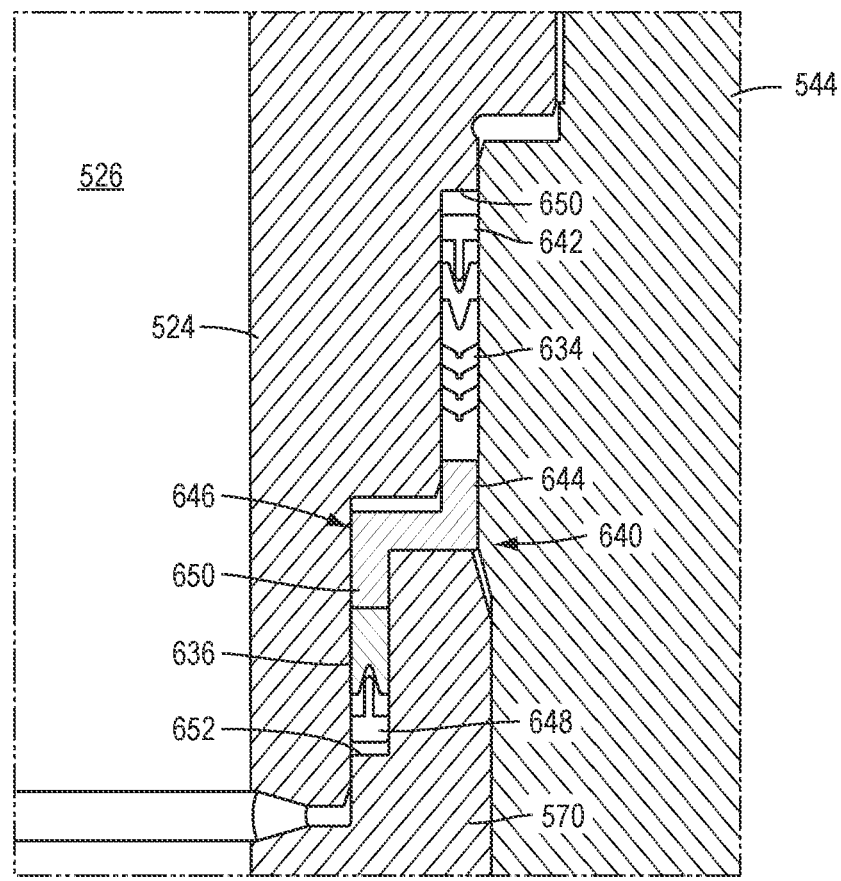
FIG. 21 is an enlarged view of the area of FIG. 19 designated by the arrow D.

In certain embodiments the first and second seals 630, 632 may comprise separate parts of an upper sealing assembly 638 and the third and fourth seals 634, 636 may comprise separate parts of a lower sealing assembly 640. In addition, the upper and lower sealing assemblies 638, 640 may be of similar construction. Referring to FIG. 21, in one embodiment of the lower sealing assembly 640, the third seal 634 may comprise a suitable packing which is positioned between an upper or axially inner T-ring 642 and the upper or axially inner leg 644 of a spacer ring 646, and the fourth seal 636 may comprise a suitable lip seal which is positioned between a lower or axially outer T-ring 648 and the lower or axially outer leg 650 of the spacer ring. As shown in FIG. 21, the upper T-ring 642 may be positioned axially adjacent an axially outer facing ledge 650 which is formed in the lower trunnion 524 of the valve member 510, and the lower T-ring 648 may be positioned axially adjacent an axially inner facing ledge 652 which is formed in the inlet mandrel 570. The upper sealing assembly 638 may comprise a similar version of the lower sealing assembly 640. Thus, in this particular example the upper sealing assembly 638 provides redundant sealing between the cavity 508 and the environment, and the lower sealing assembly 640 provides bidirectional sealing between the cavity and the inlet 504. Although not shown in the drawings, the diverter valve 500 may include a small bore valve to enable the cavity 508 to be controllably vented to the atmosphere.

In operation, once the inlet pipe assembly has been connected between the inlet 504 and the pumping system and each outlet pipe assembly has been connected between a respective outlet 506 and a corresponding well, the diverter valve 500 may be used to connect the pumping system to one of the wells by rotating the valve member 510 until the outlet branch 528 of the through bore 512 is aligned with the outlet 506 to which that well is connected. Frac fluid from the pumping system will thus be directed to the well through the inlet pipe assembly, the inlet 504, the through bore 512, the outlet 506 and the outlet pipe assembly. As in the previous embodiments, the valve member 510 may be rotated manually or using an electric or hydraulic valve actuator (not shown). After the fracturing operation has been completed, the pumping system can be connected to another well by simply rotating the valve member 510 until the outlet branch 528 is aligned with the outlet 506 of that well. This process can be repeated until all of the wells to which the diverter valve 500 is connected have been stimulated.

Figure 22:
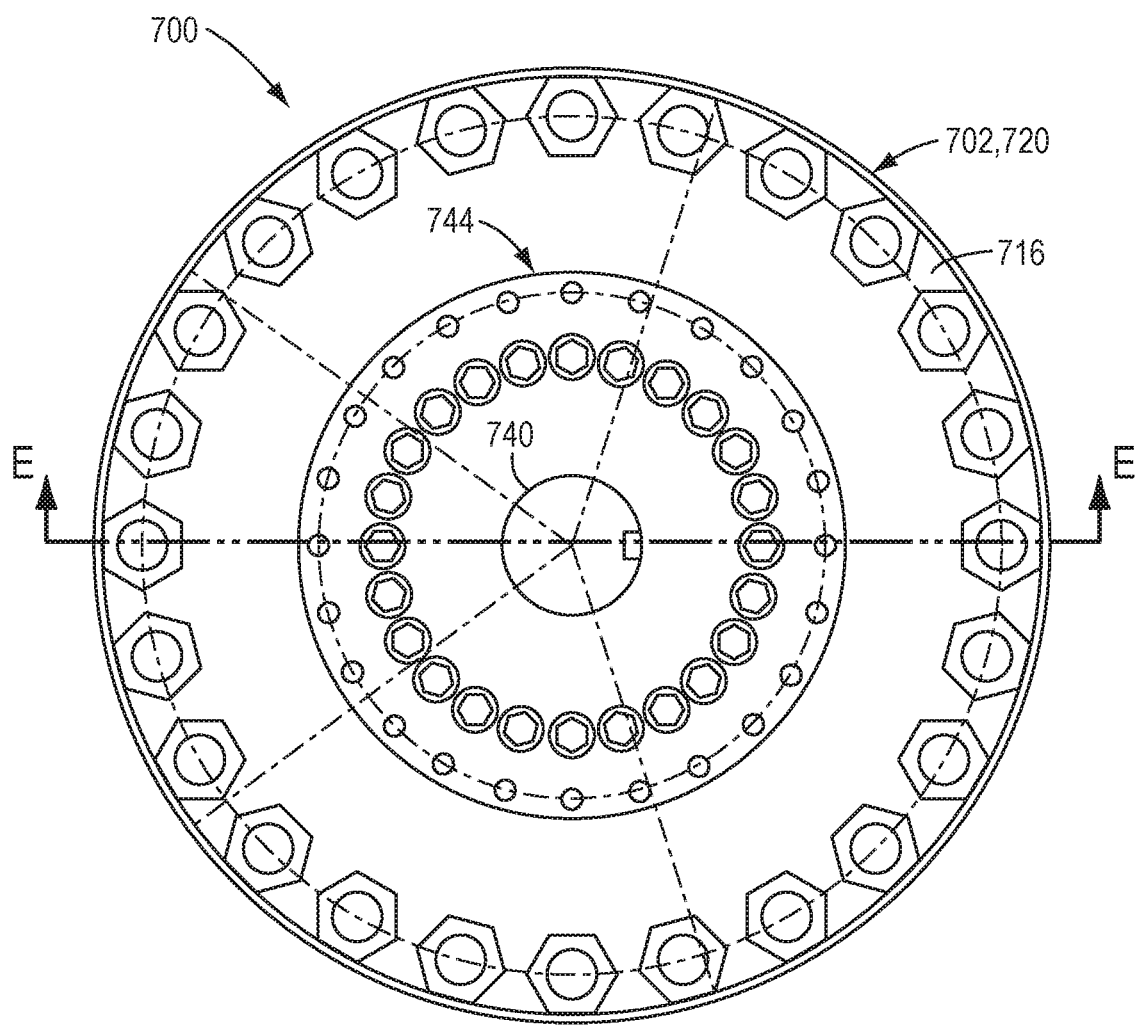
FIG. 22 is a top plan view of yet another illustrative embodiment of the diverter valve of the present disclosure.
Figure 23:
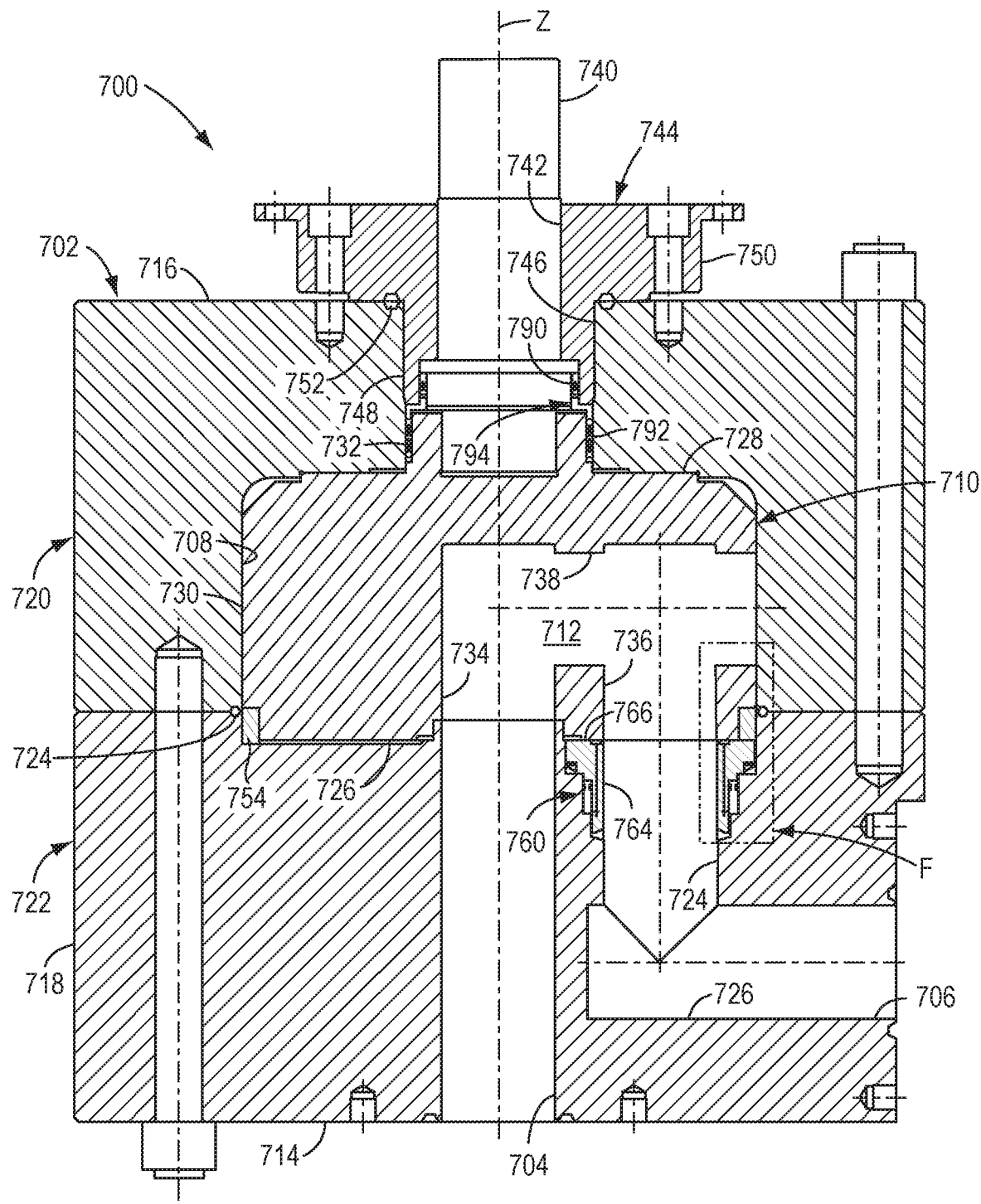
FIG. 23 is a cross sectional view of the diverter valve of FIG. 22 taken along line E-E.
Figure 24:
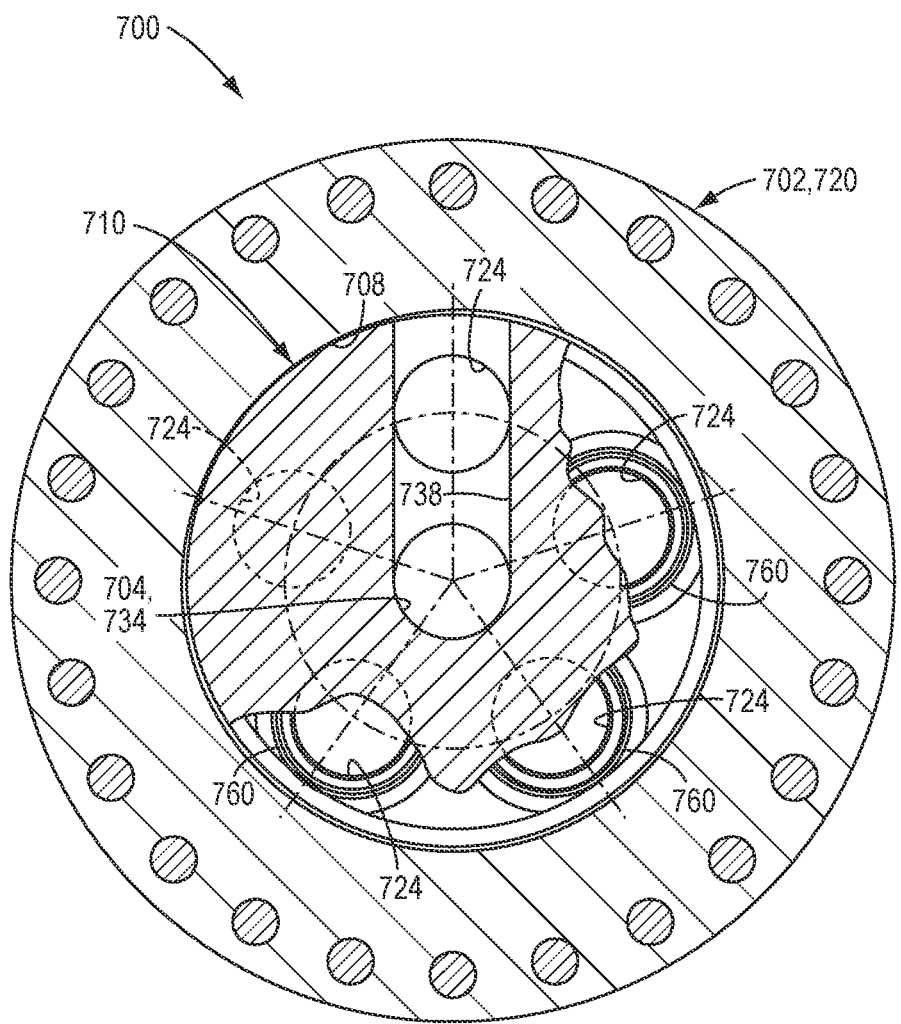
FIG. 24 is a lateral cross sectional view of the diverter valve of FIG. 22 shown looking downward.

In the illustrative embodiment of the disclosure shown in FIGS. 15-19, the diverter valve 500 has five outlets 506. Thus, up to five wells may be connected to the diverter valve 500. However, in other embodiments the diverter valve 500 may have fewer or more than five outlets 506. Also, one of the outlets 506 can be closed off with a blind flange. In this manner, positioning the valve member 510 so that the outlet branch 528 is aligned with the outlet 506 to which the blind flange is connected will operate to close the diverter valve 500. Another embodiment of the diverter valve of the present disclosure is shown in FIGS. 22-24. The diverter valve of this embodiment, generally 700, includes a valve body 702, an inlet 704, a plurality of outlets 706 (in this example five), an internal cavity 708 which is connected to the inlet and the outlets, and a valve member 710 which is movably positioned in the cavity. The valve member 710 comprises a through bore 712 which is configured to connect the inlet 704 with a corresponding one of the outlets 706 depending on the operative position of the valve member. In operation of the diverter valve 700, the valve member 710 is movable between its operative positions to selectively connect the inlet 704 with one of the outlets 706.

In this embodiment, the valve body 702 includes a bottom 714, a top 716 and a generally cylindrical side surface 718. The inlet 704 is located in the bottom 714 and the outlets 706 are spaced generally equally around the side surface 718. To facilitate assembly of the diverter valve 700, the valve body 702 may comprise an upper body section 720 in which the cavity 708 is located and a lower body section 722 in which the inlet 704 and the outlets 706 are located. In one embodiment, the inlet 704 extends axially through the lower body section 722 and each outlet 706 comprises an axial branch 724 which is connected to the cavity 708 and a lateral branch 726 which extends from the axial branch through the side surface 718 of the valve body 702. The upper body section 720 is bolted or otherwise connected to the lower body section 722 and is sealed thereto by a suitable seal 724.

The valve member 710 is rotatably supported in the cavity 708 about an axis Z. In one embodiment, the valve member 710 comprises a generally disc-shaped configuration which includes a generally flat bottom 726, a mostly flat top 728, a cylindrical side surface 730, and possibly also a trunnion 732 which extends axially upwardly from the top. In addition, the through bore 712 may include a generally U-shaped configuration comprising an axially extending inlet branch 734 which is connected to the inlet 704, an axially extending outlet branch 736 which is connectable to each outlet 706 in turn, and a laterally extending intermediate branch 738 which extends between the inlet branch and the outlet branch. In order to simplify manufacture, the intermediate branch 738 may extend completely through the side surface 730 of the valve member 710. In this embodiment, the inlet branch 734 includes an upstream end which defines a first end of the through bore 712 and the outlet branch 736 includes a downstream end which defines a second end of the through bore.

The valve member 710 is rotated between its operative positions by means of a valve stem 740 which extends through an axial hole 742 in a valve bonnet 744. The bonnet 744 is connected to the valve body 702 over an access bore 746 which extends to the cavity 708, In one embodiment, the bonnet 744 includes a bonnet mandrel 748 which is configured to be received in the access bore 746 and a bonnet flange 750 which extends radially from the bonnet mandrel and is bolted or otherwise connected to the top 716 of the valve body 702. The bonnet 744 may be sealed to the valve body 702 by a suitable seal 752 which may be positioned, e.g., between the bonnet flange 750 and the top 716 of the valve body.

Figure 25:
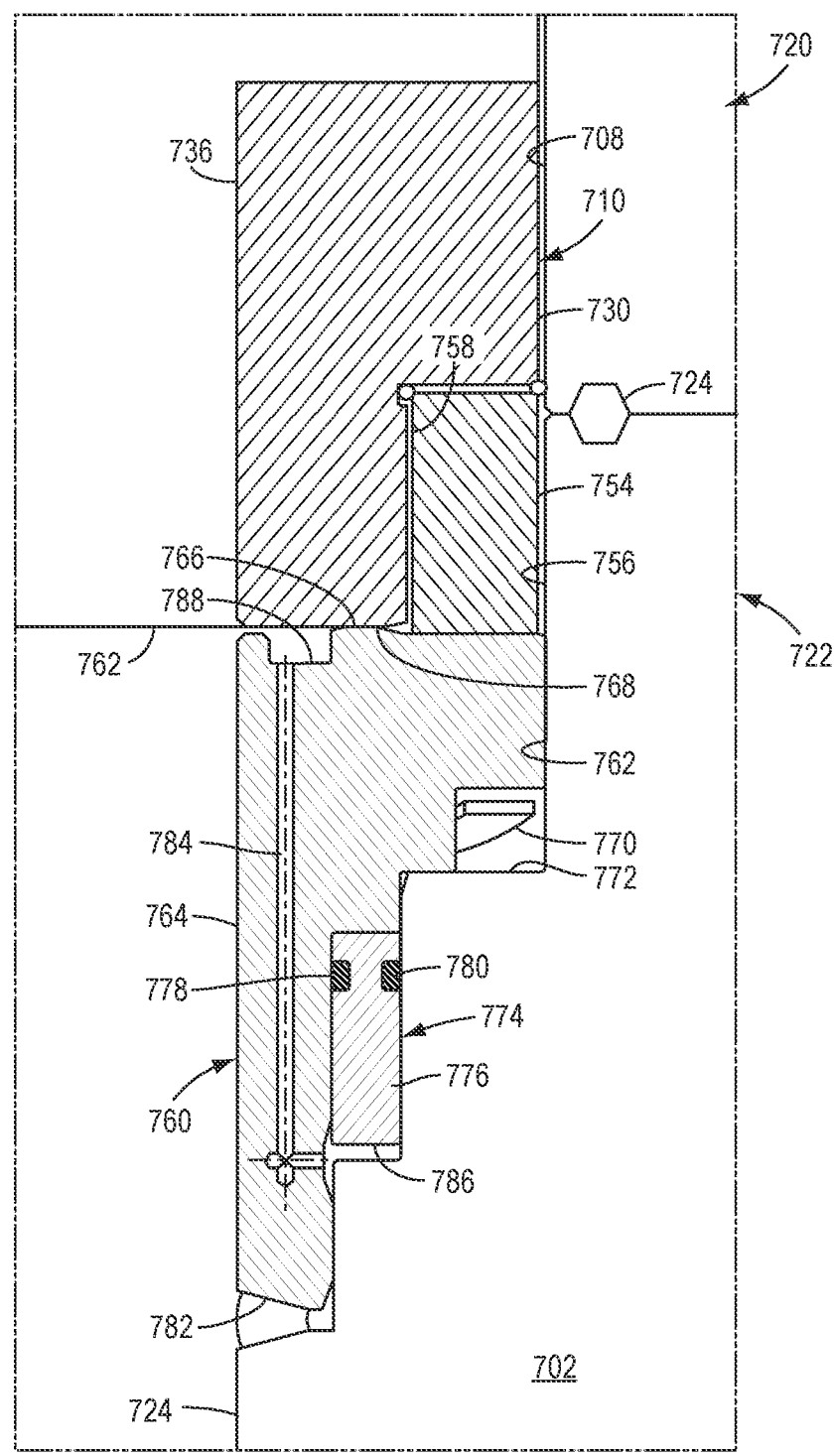
FIG. 25 is an enlarged view of the area of FIG. 23 designated by the arrow F.

In some embodiments, the valve member 710 may be rotatably supported on a bearing ring 754. Referring also to FIG. 25, the bearing ring 754 may be mounted in a circular recess 756 which is formed in the top of the lower body section 722. The bearing ring 754 may comprise a rectangular cross section which is configured to be received in a corresponding annular groove 758 which is formed in the valve member 710 at the intersection of the bottom 726 and the side surface 730. In an alternative embodiment, the bearing ring 754 may be mounted to the valve member 710, such as in the annular groove 758.

Each outlet 706 may be sealed to the through bore 712 by means of a corresponding valve seat 760 which is positioned at the intersection of the axial branch 724 of the outlet and the outlet branch 736 of the through bore. Referring also to FIG. 25, for example, each valve seat 760 may be positioned in a stepped counterbore 762 which is formed in a respective axial branch 724. Each valve seat 760 includes a seat bore 764 which is aligned with the axial branch 724 and an annular sealing face 766 which is configured to sealingly engage a circular sealing surface 768 located on the bottom 726 of the valve member 710 adjacent the outlet branch 736. A suitable biasing means, such as a Belleville washer 770, may be positioned between the valve seat 760 and a radial step 772 in the counterbore 762 in order to bias the sealing face 766 against the sealing surface 768. Also, the valve seat 760 may be sealed to the counterbore 762 by a suitable seal 774, which may, for example, comprise a cylindrical seal body 776 and a pair of radially inner and outer circular sealing members 778, 778 that are positioned between the seal body and the valve seat 760 and between the seal body and the counterbore 762, respectively.

In one embodiment of the disclosure, each valve seat 760 may provide bidirectional sealing capability. For example, when the valve member 710 is positioned to connect the inlet 704 to an outlet 706, the associated seat 760 will seal the cavity 708 from the pressure being communicated to the well to which that outlet is connected. Also, when the valve member 710 is positioned to close an outlet 706 from the inlet 704, the associated seat 760 will seal the cavity 708 from pressure in the well to which that outlet is connected. In this situation, the valve seat 760 will also seal the outlet 706 from pressure in the cavity 708.

The valve seat 760 and the seal 774 may also be configured to provide a double piston effect to force the sealing face 766 into firm sealing engagement with the sealing surface 768 on the valve member 710. As shown in FIG. 25, for example, the valve seat 760 may be slidably positioned in the counterbore 762 and the seal 774 may be slidably positioned on the valve seat, in which event pressure in the outlet 706 (either the pressure being communicated to the well when the outlet is open or pressure from the well when the outlet is closed) will act on an axially outer end 782 of the valve seat and the axially outer end 786 of the seal body 776 to both force the valve seat axially inwardly against the valve member 710 and force the seal body axially inwardly against the valve seat, which in turn will force sealing face 766 into firm sealing engagement with the sealing surface 768.

In certain embodiments, the seal 774 may also function to seal its associated outlet bore 706 from pressure in the cavity 708. If pressure is present in the cavity 708, this pressure will migrate around the outer surface of the valve seat 760 and be contained by the seal 774, In addition, if the seal 774 is slidably positioned on the valve seat 760, pressure in the cavity 708 will force the seal axially outwardly against an adjacent axially inwardly facing shoulder in the counterbore 762, which will thus expose the adjacent axially outwardly facing shoulder of the valve seat 760 to the pressure. This pressure will in turn force the valve seat 760 axially inwardly to thereby force the sealing face 766 into sealing engagement with the sealing surface 768. In certain embodiments, the valve seat 760 may include an axial bypass port 784 to communicate pressure in the outlet 706 to an axially outer end 786 of the seal body 776 via an optional circular groove 788 located radially inwardly of the sealing face 766. The double piston sealing effect provided by the valve seat 760 and the seal 774 will greatly enhance the ability of the sealing face 766 760 to maintain tight sealing engagement with the valve member 710.

Referring again to FIG. 23, the diverter valve 700 may comprise suitable means for sealing the cavity 708 from the environment. For example, the diverter valve 700 may include a first seal 790 for sealing between the valve stem 740 and the bonnet 744 and a second seal 792 for sealing between the valve member 710 and the valve body 702. For instance, the first seal 790 may be positioned between the valve stem 740 and the bonnet mandrel 748 and the second seal 792 may be positioned between the upper trunnion 732 of the valve member 710 and the access bore 746. In certain embodiments the first and second seals 790, 792 may comprise separate parts of sealing assembly 794 which is similar to the upper sealing assembly 638 described above. Thus, the sealing assembly 794 may provide redundant sealing between the cavity 708 and the environment. Also, although not shown in the drawings, the diverter valve 700 may include a small bore valve to enable the cavity 708 to be controllably vented to the atmosphere.

In operation, once the inlet pipe assembly has been connected between the inlet 704 and the pumping system and each outlet pipe assembly has been connected between a respective outlet 706 and a corresponding well, the diverter valve 700 may be used to connect the pumping system to one of the wells by rotating the valve member 710 until the outlet branch 736 of the through bore 712 is aligned with the axial branch 724 of the outlet 706 to which that well is connected. Frac fluid from the pumping system will thus be directed to the well through the inlet pipe assembly, the inlet 704, the through bore 712, the outlet 706 and the outlet pipe assembly. As in the previous embodiments, the valve member 710 may be rotated manually or using an electric or hydraulic valve actuator (not shown). After the fracturing operation has been completed, the pumping system can be connected to another well by simply rotating the valve member 710 until the outlet branch 736 is aligned with the axial branch 724 of the outlet 706 of that well. This process can be repeated until all of the wells to which the diverter valve 700 is connected have been stimulated.

In the embodiment shown in FIGS. 22-24, the diverter valve 700 has five outlets 706. Thus, up to five wells may be connected to the diverter valve 700. However, in other embodiments the diverter valve 700 may have fewer or more than five outlets 706. Also, one of the outlets 706 can be closed off with a blind flange. In this manner, positioning the valve member 710 so that the outlet branch 736 is aligned with the outlet 706 to which the blind flange is connected will operate to close the diverter valve 700. Although not shown in the drawings, a suitable inlet spool, such as the inlet spool 250 described above, may be connected to the valve body 702 over the inlet 704 to facilitate connecting the inlet to the inlet pipe assembly. Likewise, suitable outlet spools, such as the outlet spool 252 described above, may be connected to the valve body 702 over each outlet 706 to facilitate connecting the outlets to their respective outlet pipe assemblies.

Figure 26:
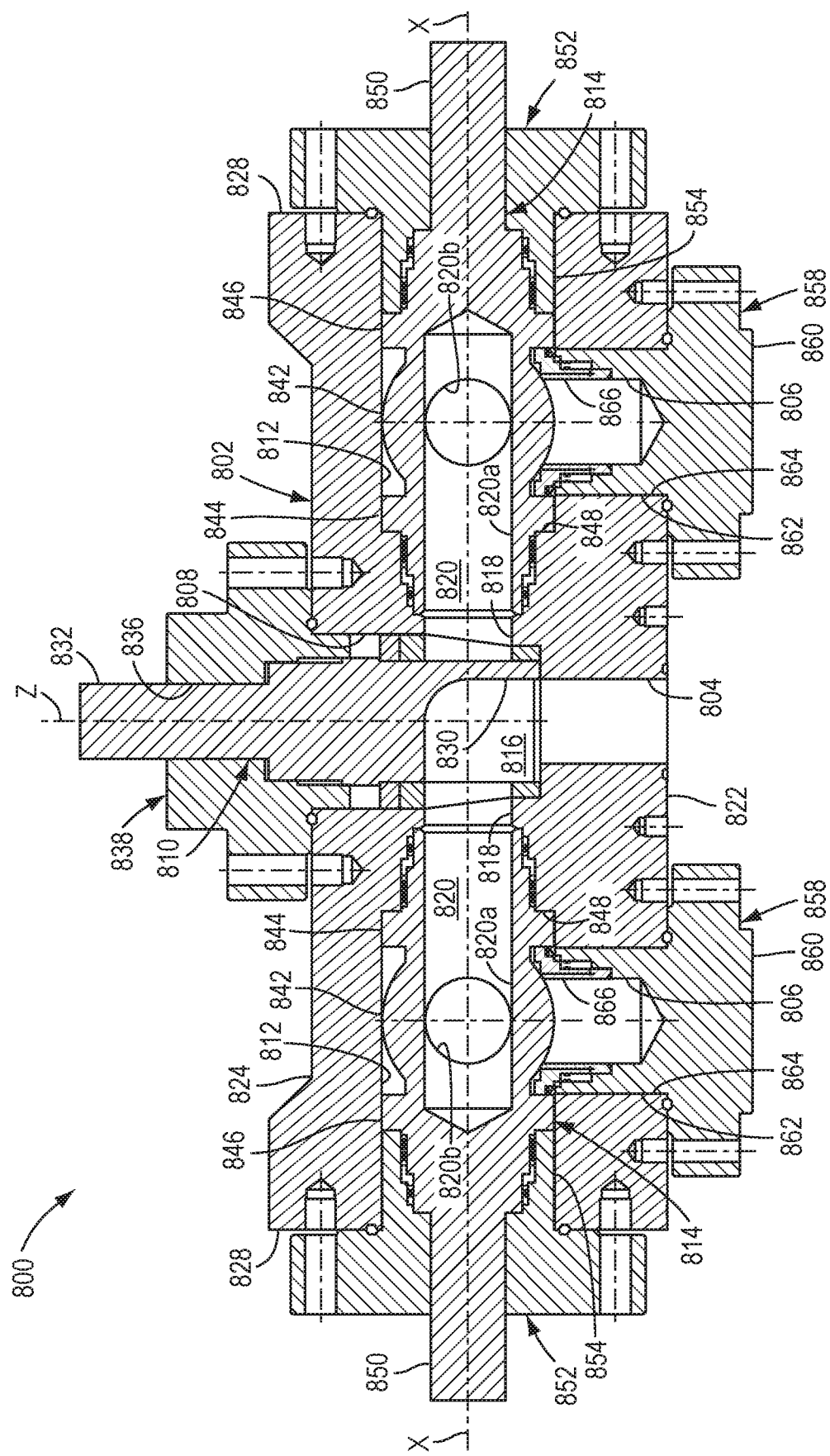
FIG. 26 is a side cross sectional view of a further illustrative embodiment of the diverter valve of the present disclosure.
Figure 27:
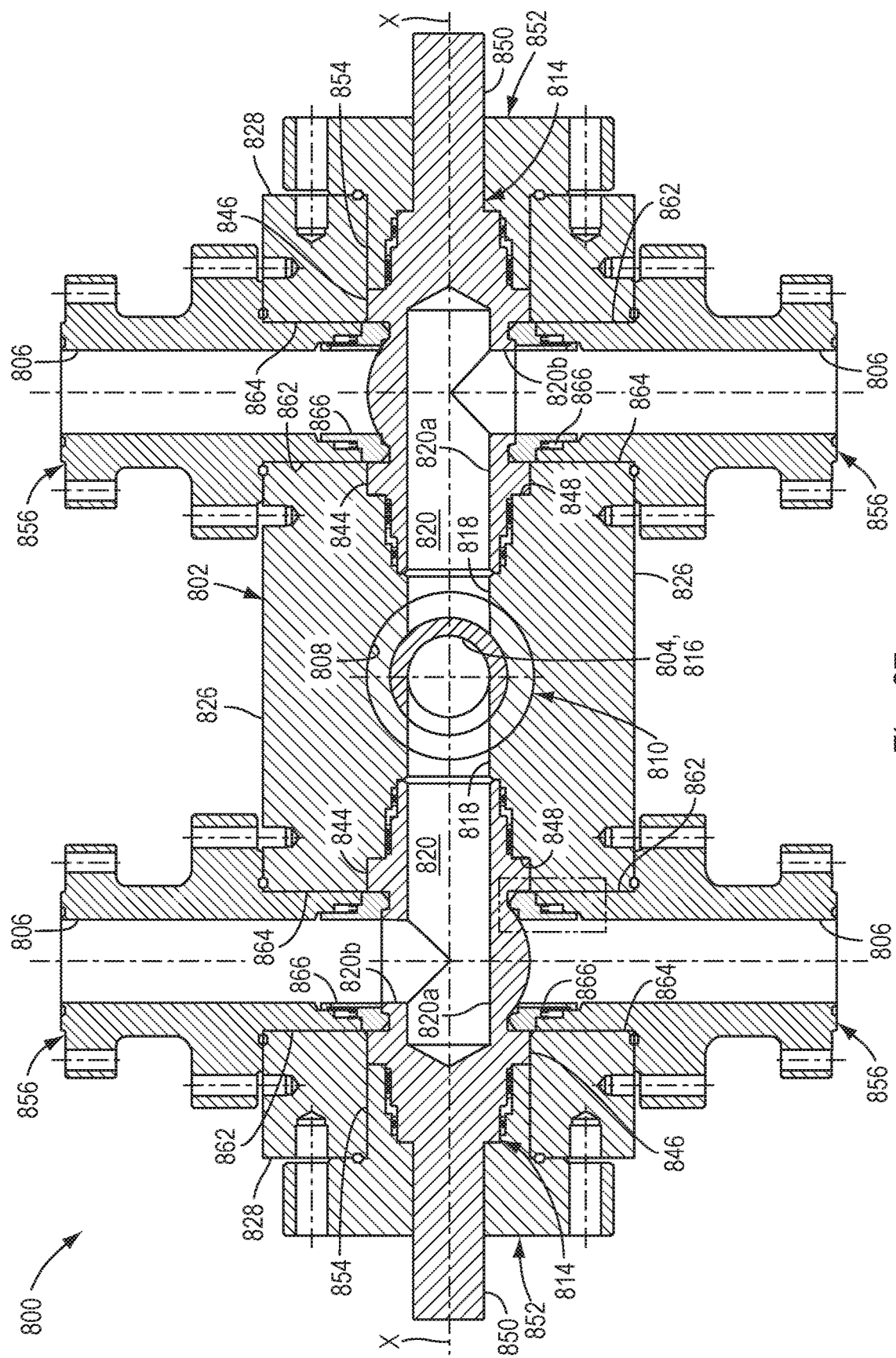
FIG. 27 is a lateral cross sectional view of the diverter valve of FIG. 26 shown looking downward.

Yet another embodiment of the diverter valve of the present disclosure will be described with reference to FIGS. 26-29. Referring first to FIGS. 26 and 27, the diverter valve of this particular embodiment, which is indicated generally by reference number 800, includes a valve body 802, an inlet 804, a plurality (in this case six) of outlets 806, a first cavity 808, a first valve member 810 which is movably positioned in the first cavity, a plurality (in this case two) of second cavities 812, and a corresponding number of second valve members 814, each of which is movably positioned in a respective second cavity. In this embodiment, the plurality of outlets 806 is comprised of a plurality of different sets of outlets, and each set of outlets is connected to a respective cavity 812. Thus, in the specific example of the diverter valve 800 shown in the drawings, the plurality of outlets 806 is divided into two sets of outlets, a first set of three outlets which is positioned on the left-hand side of the diverter valve and a second set of three outlets which is positioned on the right-hand side of the diverter valve (as viewed in FIGS. 26 and 27). However, depending on the size of the valve body 802, the diverter valve 800 may comprise three or more sets of outlets 806, each of which is connected to a respective cavity 812.

The first valve member 810 comprises a through bore 816 which is configured to connect the inlet 804 with one of a plurality (in this case two) of inlet ports 818, each of which is connected to a corresponding second valve member 814. Also, each second valve member 814 comprises a through bore 820 which is configured to connect a corresponding inlet port 818 to one of the outlets 806, depending on the operative position of the second valve member. In operation of the diverter valve 800, the first valve member 810 is movable to selectively connect the inlet 804 to one of the inlet ports 818, and each second valve member 814 is movable to selectively connect the inlet branch to one of the outlets 806.

Thus, the first valve member 810 functions to direct the fluid flow through a first inlet port 818 while minimizing or eliminating fluid flow to the second inlet port 818. This will allow one of the second valve members 814 which is connected to the second inlet port 818 to be opened while at the same time a fracturing operation is carried out on a well which is connected to the first inlet branch. Consequently, this arrangement not only eliminates the necessity to operate the second valve member 814 under flow, but it also eliminates the need to shut down or otherwise disconnect the pumping system from the diverter valve 800 when switching the fracturing operation from well to well.

In the example depicted in FIGS. 26 and 27, the valve body 802 has a generally rectangular block configuration which includes a bottom 822, a top 824, two long sides 826 and two short sides 828. In addition, the inlet 804 is located in the bottom 822, two outlets 806 are located in the bottom 822, and two outlets 806 are located in each long side 826. Other arrangements for the placement of the inlet 804 and the outlets 806 are also possible.

Figure 28:
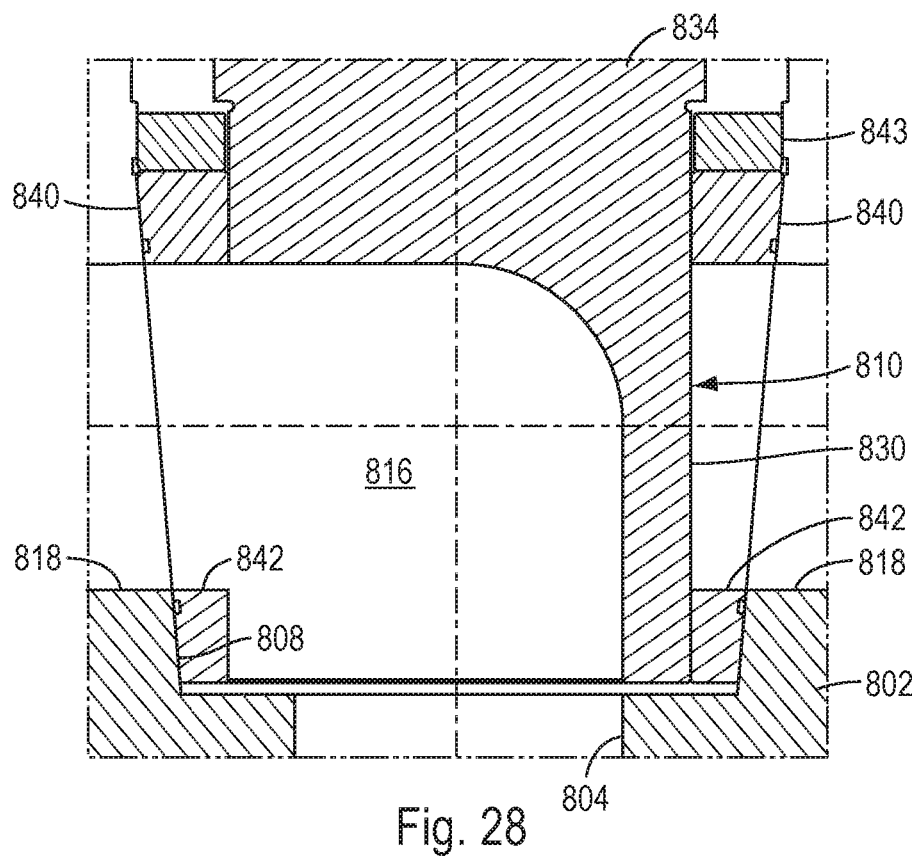
FIG. 28 is an enlarged cross sectional view of a portion of the first valve member component of the diverter valve of FIG. 26.

As shown best in FIG. 26, the first valve member 810 is rotatably supported in the first cavity 808 about an axis Z. Referring also to FIG. 28, the first valve member 810 includes a diverter portion 830 which as shown in FIG. 27 comprises a generally semicircular lateral cross section that defines the flowbore 816. The diverter portion 830 is connected to a valve stem 832, either directly or through an optional annular body portion 834 which extends axially between the diverter portion 830 and the valve stem. The valve stem 832 extends through a corresponding hole 836 in a first bonnet 838 which is secured and sealed to the valve body 802 over the first cavity 808 by suitable means. Referring still to FIG. 28, the diverter portion 830 may be positioned between a pair of first valve seats 840, each of which comprises a seat bore 842 that is aligned with a corresponding inlet port 818. The first valve seats 840 may be secured in the first cavity 808 by an optional retainer ring 843, which may be threaded or otherwise secured in the first cavity against the upper axial ends of the seats.

Referring again to FIGS. 26 and 27, each second valve member 814 is somewhat similar to the valve member 510 described above and is supported in a corresponding second cavity 812 for rotation about an axis X. Each axis X may be parallel the axis Z or, as shown in the figures, oriented ninety degrees relative to the axis Z, Each second valve member 814 includes a generally spherical portion 842 which is positioned between axially inner and outer trunnions 844, 846. Similar to the closure member 510 described above, each second through bore 820 includes an inlet branch 820*a* which extends axially through the axially inner trunnion 844 and an outlet branch 820*b* which extends laterally through the spherical portion 842. In this embodiment, the inlet branch 820*a* includes an upstream end which defines a first end of the second through bore 820 and the outlet branch 820*b* includes a downstream end which defines a second end of the second through bore.

Each axially inner trunnion 844 may be positioned against a radial shoulder 848 which is formed in the cavity 812. Also, each axially outer trunnion 846 is connected to a respective valve stem 850 which extends through a corresponding hole in a second bonnet 852 that is secured and sealed to the valve body 802 over the second cavity 812 by suitable means. Similar to the bonnet 622 described above, each bonnet 852 may include a bonnet mandrel 854 having an axially inner end which engages the axially outer trunnion 846 to thereby secure the second valve member 814 in the second cavity 812. In certain embodiments, the axially inner and outer trunnions 844, 846 may be sealed to the valve body 802 and the bonnet mandrel 854, respectively, by a suitable seal, such as the sealing assemblies 638, 640 described above.

In the present embodiment, each outlet bore 806 is formed in a corresponding outlet spool 856 which may be similar in most respects to the outlet spool 568 described above. As shown in FIG. 26, however, some (in this case two) of the outlets 806 may be formed in corresponding outlet cap spools 858 which are similar to the outlet spools 856 but comprise a closed outer end 860 to thereby seal off the outlet and provide a closed position for the associated second valve member 814. Similar to the outlet spool 568, each outlet spool 856 and outlet cap spool 858 includes an outlet mandrel 862 which is configured to be received in a corresponding outlet bore 864 that extends through the valve body 802 to the second cavity 812.

Figure 29:
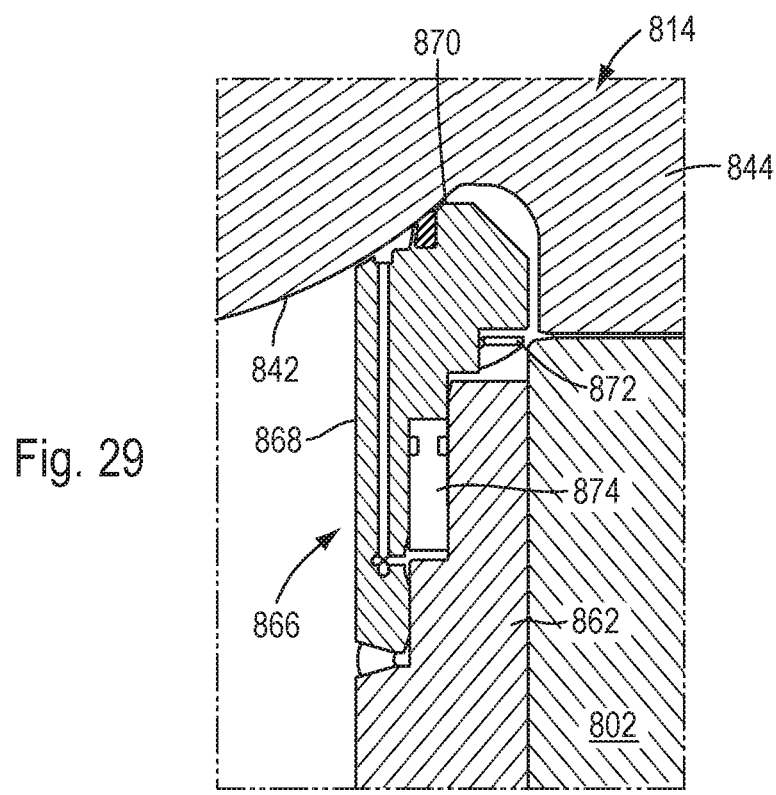
FIG. 29 is an enlarged view of the area of FIG. 27 designated by the arrow G.

Each second valve member 814 is positioned between a plurality of second valve seats 866, each of which is positioned at the intersection of the second cavity 812 and a corresponding outlet 806. Each second valve seat 866 may be substantially similar to the valve seat 590 described above. As shown in FIG. 29, therefore, each valve seat 866 includes a seat bore 868 which is aligned with the outlet 806 and an annular sealing face 870 which is configured to sealingly engage the spherical portion 842 of the second valve member 814. A suitable biasing means, such as a Belleville washer 872, may be positioned between the valve seat 866 and an axially inner end of the outlet mandrel 862 in order to bias the sealing face 870 against the spherical portion 842. Also, the valve seat 866 may be sealed to the outlet mandrel 862 by a suitable seal 874, which may be similar in most respects to the seal 606 described above. Thus, similar to the valve seat 590, the second valve seats 866 are capable of providing bidirectional sealing functionality as well as a double piston sealing effect to enhance the ability of the valve seat to maintain tight sealing engagement with the valve member 814.

In operation, once the inlet pipe assembly has been connected between the inlet 804 and the pumping system and each outlet pipe assembly has been connected between a respective outlet 806 and a corresponding well, the diverter valve 800 may be used to connect the pumping system to one of the wells by rotating the first valve member 810 to connect the inlet 804 to one of the inlet ports 818 and rotating the second valve member 814 until the outlet branch 820*b* of the second through bore 820 is aligned with the outlet 806 to which that well is connected. Frac fluid from the pumping system will thus be directed to the well through the inlet pipe assembly, the inlet 804, the first through bore 816, the inlet port 818, the second through bore 820, the outlet 806 and the outlet pipe assembly. As in the previous embodiments, the first and second valve members 810, 814 may be rotated manually or using an electric or hydraulic valve actuator (not shown). After the fracturing operation has been completed, the pumping system can be connected to another well by simply rotating the first valve member 810 and/or one of the second valve members 814 until the inlet 804 is connected to the outlet 806 of that well. This process can be repeated until all of the wells to which the diverter valve 800 is connected have been stimulated.

In a further embodiment of the disclosure, the first cavity 808 and the first valve member 810 are omitted from the diverter valve. In this embodiment, fluid from the inlet 804 is directed to each set of outlets 806 simultaneously. In this manner, fracturing operations can be conducted on two wells at the same time, if desired. In an embodiment of the diverter valve 800 which includes more than two sets of outlets 806, a corresponding number of inlet ports 818 will connect the inlet 804 with each set of outlets simultaneously.

In the context of a well fracturing operation, the first valve member 810 permits an operator to switch between wells while the frac fluid is flowing. The first valve member 810 directs the majority of the frac fluid to one side of the diverter valve 800 while flowing to a well. This allows the second valve member 814 on the opposite of the diverter valve 800 to be operated with little or no flow. This second valve member 814 can be rotated from a closed off outlet port 806 to an open outlet port without risking damage to its seats and sealing surfaces. Once the second valve member 814 is positioned, the first valve member 810 can be rotated on flow to divert the flow from the previous well to the newly selected well. The second valve member 814 for the previously selected well can now be rotated to the closed position with little or no flow, thus preserving its seat and sealing surfaces.

In the illustrative embodiment of the disclosure shown in FIGS. 26-29, the diverter valve 800 has six outlets 806, two of which are closed off with outlet cap spools 858. Thus, up to four wells may be connected to the diverter valve 800. However, in other embodiments the diverter valve 800 may have fewer or more than five outlets 806. Also, although not shown in the drawings, a suitable inlet spool, such as the inlet spool 250 described above, may be connected to the valve body 802 over the inlet 804 to facilitate connecting the inlet to the inlet pipe assembly.

A representative well fracturing site with which the diverter valves of the present disclosure may be used is illustrated in FIG. 30. The well fracturing site, generally 900, is shown to include a number (in this case four) of frac trees 902 which are installed over corresponding well bores (not shown). In this embodiment, a diverter valve 904 in accordance with any of the above-described embodiments is positioned on an optional well pad 906. As shown in FIG. 30, the diverter valve 904 may include an electrically or hydraulically operated valve actuator 908 to enable remote operation of the diverter valve. The diverter valve 904 is connected to a conventional pumping system (not shown) via an inlet pipe assembly 910, which may include a conventional valve 912 for controlling flow between the pumping system and the diverter valve 904. The diverter valve 904 is also connected to each frac tree 902 via a corresponding outlet pipe assembly which in a preferred embodiment includes a flexible flowline 914, such as a Coflexip® flexible line sold by TechnipFMC of Paris, France. The flexible flowlines 914 are lighter and easier to install than conventional flowlines, which must typically be assembled from multiple metal pipes and connectors.

It should be recognized that, while the present disclosure has been presented with reference to certain illustrative embodiments, those skilled in the art may develop a wide variation of structural and operational details without departing from the principles of the disclosure. For example, the various elements shown in the illustrative embodiments described above may be combined in a manner not specifically illustrated. Therefore, the following claims are to be construed to cover all equivalents falling within the true scope and spirit of the disclosure.

What is claimed is:

1. A diverter valve comprising:
   a valve body;
   an inlet;
   a plurality of outlets;
   an internal cavity to which the inlet and the outlets are connected; and
   a valve member which is movably positioned in the cavity, the valve member comprising a through bore which is configured to connect the inlet with a corresponding one of the outlets for each of a plurality of operative positions of the valve member;
   whereby in operation of the diverter valve, the valve member is movable between its operative positions to selectively connect the inlet with any one of the outlets;
   wherein the through bore comprises a first end which is connected to the inlet and a second end which is connectable to a respective outlet for each operative position of the valve member;
   wherein the valve member is rotatably supported in the cavity about an axis of rotation which is coaxial with the inlet;
   wherein the valve member comprises a spherical portion and the through bore comprises an inlet branch which extends through the valve member coaxially with the inlet and an outlet branch which extends through the spherical portion from the inlet branch;
   wherein the valve member is supported in the cavity between first and second retainer members which are secured to the valve body on axially opposite ends of the valve member, wherein the inlet extends through the first retainer member, and wherein the valve member is connected to a valve stem which extends through the second retainer member; and
   wherein the first retainer member is positioned in a first bore which extends through an outer surface of the valve body coaxially with the inlet, and wherein the first retainer member is removable through the first bore to thereby provide access to the valve member.

2. The diverter valve of claim 1, wherein the inlet is formed in an inlet spool which is connected to the valve body and comprises an end connection.

3. The diverter valve of claim 2, wherein the inlet spool comprises an inlet mandrel which is configured to be received in a retainer bore which extends through the first retainer member coaxially with the inlet bore, and wherein the inlet mandrel is sealed to the valve member.

4. The diverter valve of claim 1, wherein the valve member comprises first and second annular lips which are formed coaxially with the axis of rotation of the valve member on axially opposite ends of the spherical portion, and wherein each of the first and second retainer members comprises a retainer mandrel which extends through a respective bore in the valve body and engages a corresponding one of the lips to thereby inhibit axial movement of the valve member in the cavity.

5. The diverter valve of claim 4, wherein the valve member comprises first and second trunnion portions between which the spherical portion is positioned, and wherein the inlet branch extends through the first trunnion portion.

6. The diverter valve of claim 5, wherein each trunnion portion is supported in a corresponding retainer mandrel.

7. The diverter valve of claim 1, wherein the spherical portion is positioned between a plurality of valve seats, each of which is positioned at an intersection of the cavity and a corresponding outlet, and each of which includes a seat bore which is aligned with the outlet and an annular sealing face which is configured to sealingly engage the spherical portion.

8. The diverter valve of claim 7, wherein each outlet is formed in a corresponding outlet spool which is connected to the valve body and comprises an end connection.

9. The diverter valve of claim 8, wherein each outlet spool comprises an outlet mandrel which is configured to be received in a corresponding outlet bore in the valve body, and wherein each valve seat is retained in the valve body by a corresponding outlet mandrel.

10. The diverter valve of claim 9, wherein each valve seat is slidably supported in at least one of the outlet bore and the outlet mandrel, and wherein the diverter valve further comprises a plurality of seals, each of which is slidably supported and sealingly engaged between an outer diameter surface of a corresponding valve seat and at least one of the outlet bore and the outlet mandrel.

\* \* \* \* \*